(12) United States Patent  
Umeda et al.

(10) Patent No.: US 8,926,157 B2  
(45) Date of Patent: Jan. 6, 2015

(54) LIGHT DIFFUSING MEMBER AND METHOD OF MANUFACTURING THE SAME, AND DISPLAY DEVICE

(75) Inventors: Tokiyoshi Umeda, Osaka (JP); Hidefumi Yoshida, Osaka (JP); Emi Yamamoto, Osaka (JP); Toru Kanno, Osaka (JP); Tsuyoshi Maeda, Osaka (JP); Tsuyoshi Kamada, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 21 days.

(21) Appl. No.: 13/993,821

(22) PCT Filed: Dec. 8, 2011

(86) PCT No.: PCT/JP2011/078423  
§ 371 (c)(1),  
(2), (4) Date: Jun. 13, 2013

(87) PCT Pub. No.: WO2012/086424  
PCT Pub. Date: Jun. 28, 2012

(65) Prior Publication Data  
US 2013/0265774 A1    Oct. 10, 2013

(30) Foreign Application Priority Data  
Dec. 24, 2010   (JP) .................................. 2010-286886

(51) Int. Cl.  
*F21V 7/04* (2006.01)  
*G02B 5/02* (2006.01)  
*G02F 1/1335* (2006.01)

(52) U.S. Cl.  
CPC ........ *G02B 5/0278* (2013.01); *G02F 1/133504* (2013.01); *G02F 1/133606* (2013.01); *G02B 5/0247* (2013.01)  
USPC .......................................... 362/606; 362/607

(58) Field of Classification Search  
USPC ................................. 362/606–607  
See application file for complete search history.

(56) References Cited

U.S. PATENT DOCUMENTS

| 6,417,966 | B1 | 7/2002 | Moshrefzadeh et al. | |
|---|---|---|---|---|
| 2010/0020567 | A1 * | 1/2010 | Tatehata et al. | 362/606 |
| 2011/0176328 | A1 * | 7/2011 | Anandan et al. | 362/606 |

FOREIGN PATENT DOCUMENTS

| JP | 2000-089234 A | 3/2000 |
|---|---|---|
| JP | 2000-352608 A | 12/2000 |
| JP | 2003-504691 A | 2/2003 |
| JP | 2007-517929 A | 7/2007 |
| JP | 2009-217165 A | 9/2009 |

OTHER PUBLICATIONS

Official Communication issued in International Patent Application No. PCT/JP2011/078423, mailed on Feb. 14, 2012.

* cited by examiner

*Primary Examiner* — Mary Ellen Bowman  
(74) *Attorney, Agent, or Firm* — Keating & Bennett, LLP

(57) ABSTRACT

A light diffusing member includes a base material having a light transmitting property; a plurality of light blocking sections that are formed in a scattered manner at one surface of the base material; and a light transmissive material layer that is formed at the one surface of the base material. A thickness of the light transmissive material layer is larger than a thickness of each light blocking section. The light transmissive material layer has hollow portions in regions where the light blocking sections are formed. Each hollow portion has a shape in which a cross-section area when each hollow portion is cut at a plane that is parallel to the one surface of the base material is large on a side of the corresponding light blocking section and becomes gradually smaller with increasing distance from the corresponding light blocking section. A portion of the light transmissive material layer other than where the hollow portions are formed is a light transmitting section.

20 Claims, 18 Drawing Sheets

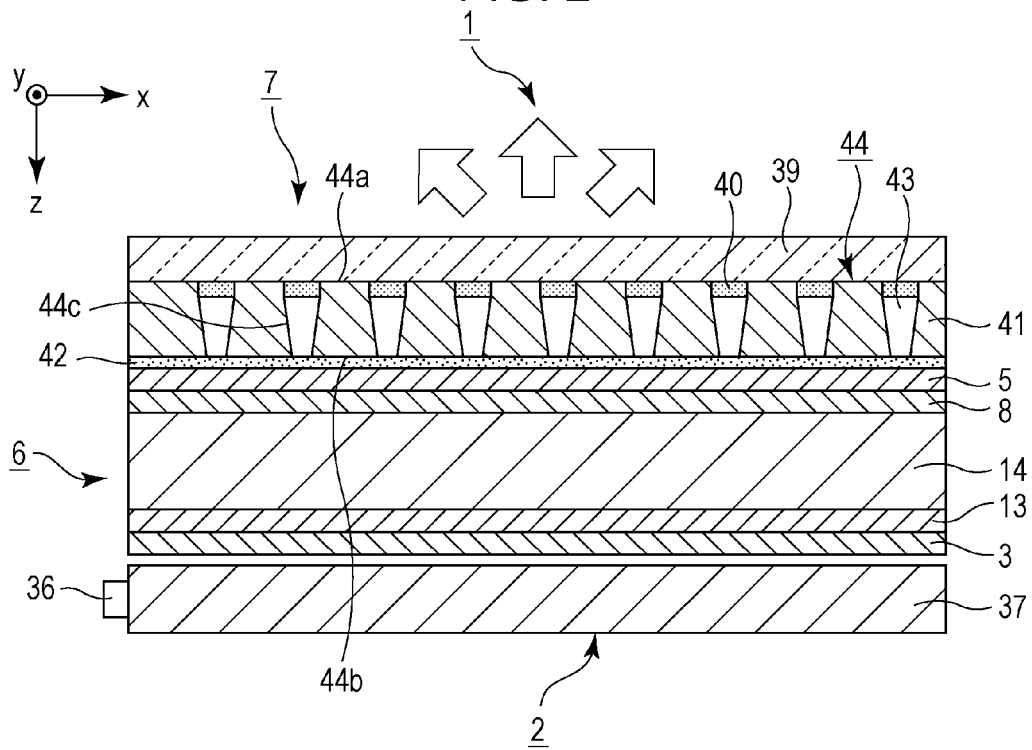
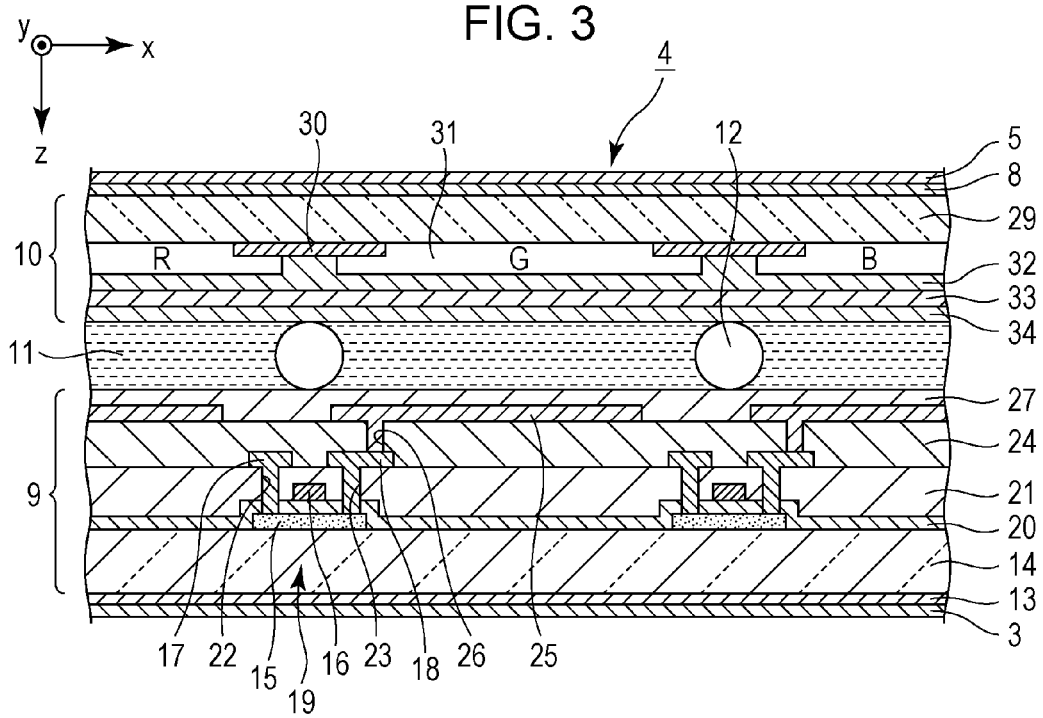

40

40b

40c

40d

40e

40f

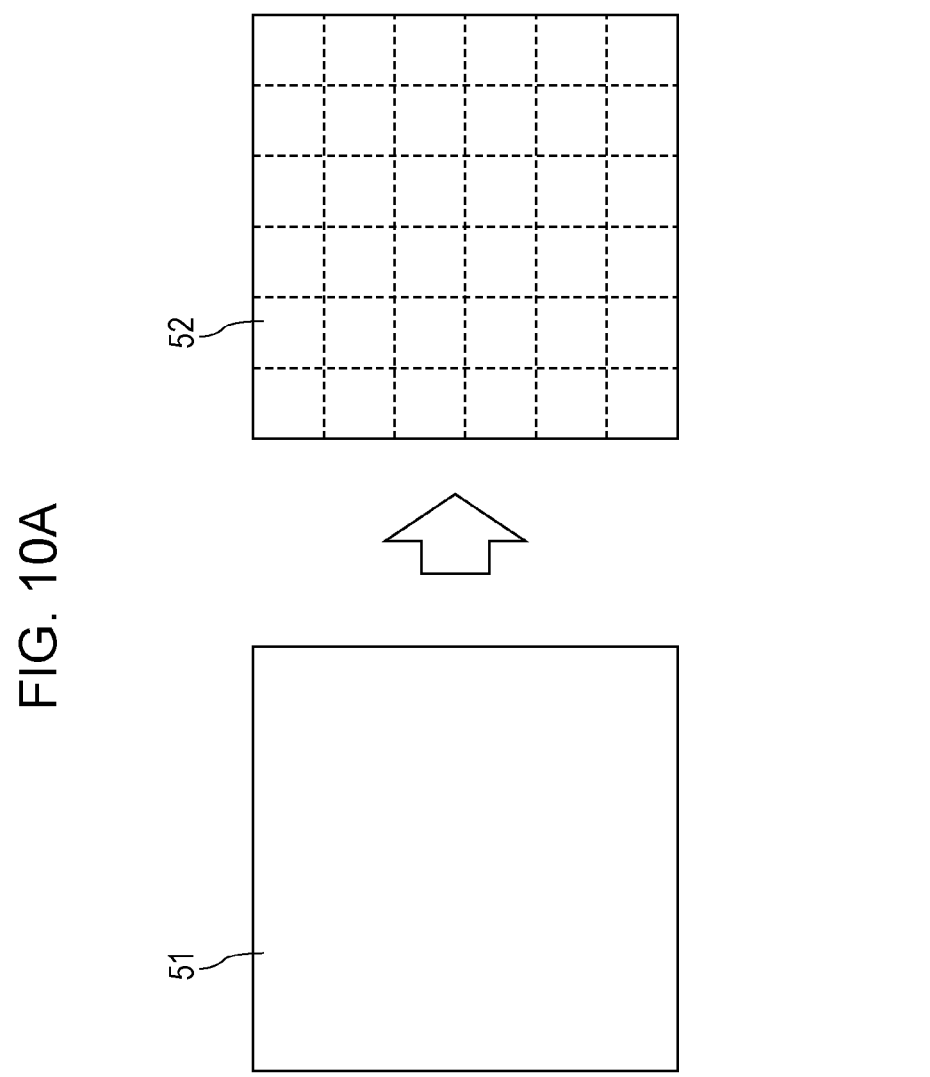

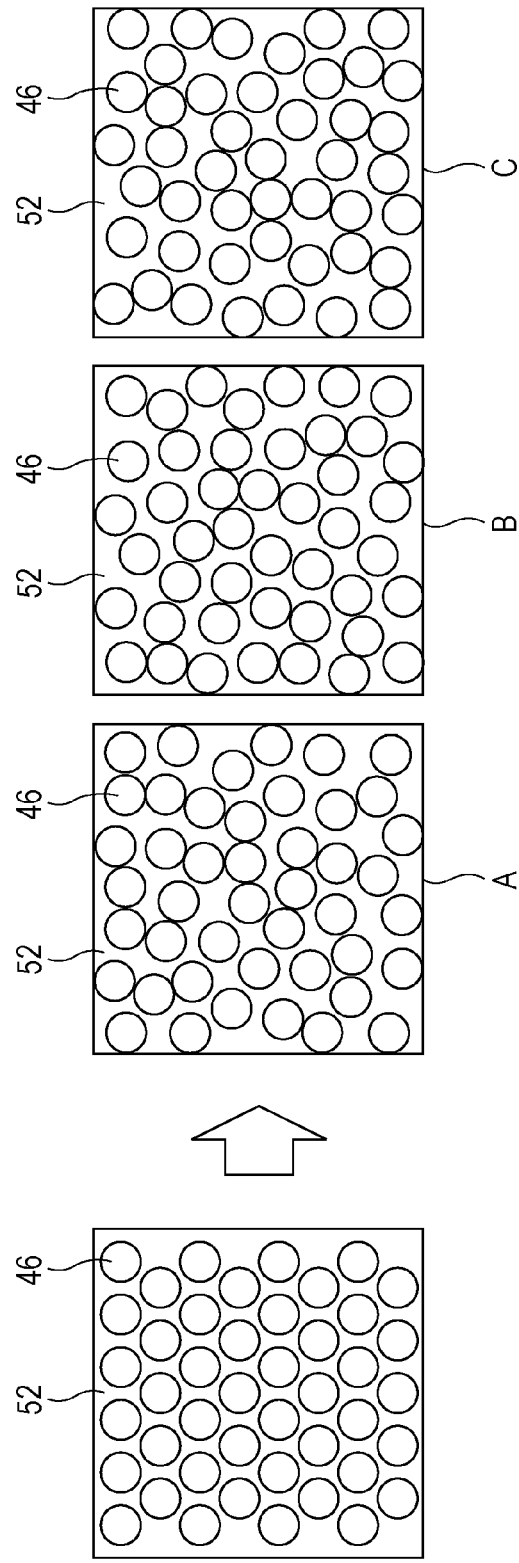

LIGHT DIFFUSING MEMBER AND METHOD OF MANUFACTURING THE SAME, AND DISPLAY DEVICE

TECHNICAL FIELD

The present invention relates to a light diffusing member and a method of manufacturing the same, and a display device.

This application is based upon and claims the benefit of priority of the prior Japanese Patent Application No. 2010-286886, filed on Dec. 24, 2010, the entire contents of which are incorporated herein by reference.

BACKGROUND ART

Liquid crystal display devices are widely used as displays of, for example, portable electronic devices including cellular phones, televisions, and personal computers. In general, hitherto, liquid crystal display devices have been known to provide excellent viewability from the front side on the one hand, but to provide a narrow viewing angle on the other. Therefore, various measures have been taken to widen the viewing angle. One such measure may be to provide a member for diffusing light that exits from a display member, such as a liquid crystal panel, (such a member is hereafter referred to as the "light diffusing member") at a viewing side of the display member.

For example, PTL 1 below discloses a rear projection screen including a base having a plurality of light diffusing ribs and a light transmissive shield provided with a light absorbing adhesive. The rear projection screen has a structure in which a space that is provided between the plurality of light-diffusing ribs is partly filled with the light absorbing adhesive. PTL 2 below discloses a light diffusing sheet in which a light diffusing layer is provided with a V-shaped groove in cross section, and a light absorbing layer is provided in a portion of the groove.

CITATION LIST

Patent Literature

PTL 1: Japanese Unexamined Patent Application Publication (Translation of PCT Application) No. 2007-517929
PTL 2: Japanese Unexamined Patent Application Publication No. 2000-352608

SUMMARY OF INVENTION

Technical Problem

In the rear projection screen that is discussed in the aforementioned PTL 1, the light transmissive shield and the light diffusing ribs of the base are bonded to each other using a light absorbing adhesive that is provided between the slight space between adjacent light diffusing ribs. Therefore, the adhesiveness between the light diffusing ribs and the light transmissive shield is low, as a result of which the light diffusing ribs and the light transmissive shield may be separated from each other. In addition, in the process of manufacturing the screen, the light absorbing adhesive remains at a contact surface between the light diffusing ribs and the light transmissive shield, that is, at a path along which light passes, as a result of which light transmittance may be reduced.

In the light diffusing sheet that is discussed in the aforementioned PTL 2, in the manufacturing process, it is necessary to join the light diffusing layer having a groove and a light blocking sheet including a light absorbing layer to each other with high precision.

Therefore, processing time of the joining step is increased, as a result of which productivity is reduced. If the light blocking sheet and the light diffusing layer that are joined to each other are not aligned, light transmittance may be reduced as in PTL 1.

A form of the present invention is achieved to solve the above-described problems. An object of a form of the present invention is to provide a light diffusing member that has high mechanical strength and that is capable of increasing viewing angle without reducing light transmittance. In addition, an object is to provide a method of manufacturing light diffusing members with high productivity. Further, an object is to provide a display device including the light diffusing member and having excellent display quality.

Solution to Problem

To this end, a light diffusing member according to an aspect of the present invention includes a base material having a light transmitting property; a plurality of light blocking sections that are formed in a scattered manner at one surface of the base material; and a light transmissive material layer that is formed at the one surface of the base material, wherein a thickness of the light transmissive material layer is larger than a thickness of each light blocking section, wherein the light transmissive material layer has hollow portions in regions where the light blocking sections are formed, wherein each hollow portion has a shape in which a cross-section area when each hollow portion is cut at a plane that is parallel to the one surface of the base material is large on a side of the corresponding light blocking section and becomes gradually smaller with increasing distance from the corresponding light blocking section, and wherein a portion of the light transmissive material layer other than where the hollow portions are formed is a light transmitting section.

In the light diffusing member according to the aspect of the invention, each light blocking section may be formed of a light absorbing material.

In the light diffusing member according to the aspect of the invention, the light absorbing material may be a resin containing carbon black.

In the light diffusing member according to the aspect of the invention, the light absorbing material may be a multilayer film formed of chromium and chromium oxide.

In the light diffusing member according to the aspect of the invention, each hollow portion may be filled with air or an inert gas, or may be in a vacuous state.

In the light diffusing member according to the aspect of the invention, each hollow portion may be filled with a low-refractive-index material having a refractive index that is lower than a refractive index of the light transmissive material layer.

In the light diffusing member according to the aspect of the invention, a difference between the refractive index of the low-refractive-index material and the refractive index of the light transmissive material layer may be greater than or equal to 0.05.

In the light diffusing member according to the aspect of the invention, interfaces between the hollow portions and the light transmissive material layer may be inclined surfaces, and a cross section shape of each inclined surface may be curved such that an inclination angle changes continuously.

In the light diffusing member according to the aspect of the invention, interfaces between the hollow portions and the light transmissive material layer may be inclined surfaces, and a cross section shape of each inclined surface may be defined by a polygonal line having a plurality of different inclination angles.

In the light diffusing member according to the aspect of the invention, the plurality of light blocking sections may be nonperiodically disposed when viewed from a direction of a normal line to the one surface of the base material.

In the light diffusing member according to the aspect of the invention, of the plurality of light blocking sections, at least one of the light blocking sections may have a size that differs from sizes of the other light blocking sections.

In the light diffusing member according to the aspect of the invention, of the plurality of hollow portions, at least one of the hollow portions may have a volume that differs from volumes of the other hollow portions.

In the light diffusing member according to the aspect of the invention, a planar shape of each light blocking section may be a circular shape, an elliptical shape, or a polygonal shape when each light blocking section is viewed from a direction of a normal line to the one surface of the base material.

In the light diffusing member according to the aspect of the invention, the base material may have light diffusibility.

In the light diffusing member according to the aspect of the invention, the light transmissive material layer may have light diffusibility.

The light diffusing member according to the aspect of the present invention may further include an adhesive layer, wherein the adhesive layer may be provided between the base material and the light transmissive material layer, and may have light diffusibility.

In the light diffusing member according to the aspect of the invention, at least one of an antireflection layer, a polarizing filter layer, an antistatic layer, an anti-glare processing layer, and an antifouling processing layer may be provided at a surface of the base material that is at a side opposite to a side of the one surface.

A light diffusing member manufacturing method according to another aspect of the present invention includes forming a plurality of light blocking sections in a scattered manner at one surface of a base material having a light transmitting property; forming a negative photosensitive resin layer having a light transmitting property at the one surface of the base material so as to cover the plurality of light blocking sections; irradiating the negative photosensitive resin layer with light via the base material at the light-absorbing-layer non-formation region from a surface of the base material at a side opposite to a side of the one surface of the base material where the light blocking sections and the negative photosensitive resin layer are formed; and forming hollow portions in regions at the negative photosensitive resin layer where the light blocking sections are formed as a resulting of developing the negative photosensitive resin layer whose irradiation with the light has been completed, each of the hollow portions having a shape in which a cross-section area when each hollow section is cut at a plane that is parallel to the one surface of the base material is large on a side of the corresponding light blocking section and becomes gradually smaller with increasing distance from the corresponding light blocking section.

In the light diffusing member manufacturing method according to the another aspect of the present invention, the light may be parallel light, diffused light, or light whose intensity at a particular exiting angle differs from an intensity at a different exiting angle.

In the light diffusing member manufacturing method according to the another aspect of the present invention, a material of each of the light blocking sections may be a black resin, or chromium, or a multilayer film formed of chromium and chromium oxide, the black resin containing at least one of a light absorbing pigment, a light absorbing dye, and carbon black.

A display device according to still another aspect of the present invention includes a display member; and a viewing angle increasing member that is provided at a viewing side of the display member, the viewing angle increasing member causing light to exit with an angle distribution of light that is incident from the display member being wider than that before the light is incident from the display member, wherein the viewing angle increasing member includes the light diffusing member.

In the display device according to the still another aspect of the present invention, the display member may have a plurality of pixels that form a display image, and, of the plurality of light blocking sections of the light diffusing member, adjacent light blocking sections may be provided at an average interval that is smaller than an interval between the pixels of the display member.

In the display device according to the still another aspect of the present invention, an information inputting device may be provided at a viewing side of the viewing angle increasing member.

In the display device according to the still another aspect of the present invention, the display member may include a light source and a light modulating element that modulates light from the light source, and the light emitted from the light source may be light having directivity.

In the display device according to the still another aspect of the present invention, the display member may be a liquid crystal display element.

Advantageous Effects of Invention

According to a form of the present invention, it is possible to provide a light diffusing member that has high mechanical strength and that is capable of increasing viewing angle without reducing light transmittance. In addition, according to a form of the present invention, it is possible to provide a method of manufacturing light diffusing members with high productivity. Further, according to a form of the present invention, it is possible to provide a display device including the light diffusing member and having excellent display quality.

BRIEF DESCRIPTION OF DRAWINGS

FIG. 2 is a sectional view of the liquid crystal display device.

FIG. 3 is a sectional view of a liquid crystal panel in the liquid crystal display device.

FIG. 10A shows an arrangement of light blocking sections of the light diffusing sheet.

FIG. 10B shows arrangements of the light blocking sections of the light diffusing sheet.

DESCRIPTION OF EMBODIMENTS

First Embodiment

A first embodiment of the present invention will hereunder be described using FIGS. 1 to 6B.

In the embodiment, a description is given using, as an example, a liquid crystal display device including a transmissive liquid crystal panel serving as a display member.

In all of the figures below, in order to make it easier to see each structural element, the dimensional scale may differ depending upon the structural element.

Figure 1:
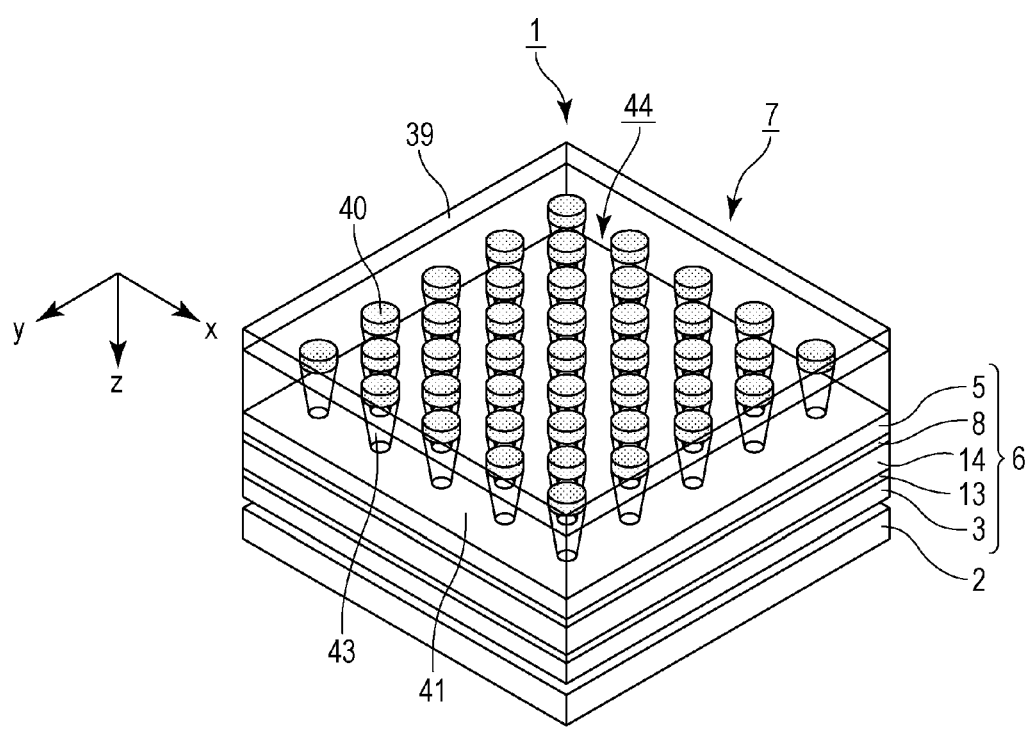
FIG. 1 is a perspective view of a liquid crystal display device according to a first embodiment.

FIG. 1 is a perspective view of a liquid crystal display device according to an embodiment when seen from obliquely above (from a viewing side of) the liquid crystal display device according to the embodiment. FIG. 2 is a sectional view of the liquid crystal display device according to the embodiment.

As shown in FIGS. 1 and 2, a liquid crystal display device 1 (display device) according to the embodiment includes a backlight 2 (light source), a liquid crystal panel 6 (display member), and a light diffusing sheet 7 (viewing angle increasing member, light diffusing member). The liquid crystal panel 6 includes a first polarizing plate 3, a first retardation plate 13, a pair of glass substrates 14, a second retardation plate 8, and a second polarizing plate 5, the pair of glass substrates 14 sandwiching, for example, a liquid crystal layer and color filters. FIGS. 1 and 2 schematically show the pair of glass substrates 14, which sandwich, for example, the liquid crystal layer and the color filters, as one plate. A detailed structure thereof is described later using FIG. 3. A viewer views a display from an upper side of the liquid crystal display device 1 in FIG. 2 where the light diffusing sheet 7 is disposed. Therefore, in the description below, the side where the light diffusing sheet 7 is disposed is called the viewing side, and the side where the backlight 2 is disposed is called a back side.

In the liquid crystal display device 1 according to the embodiment, light emitted from the backlight 2 is modulated by the liquid crystal panel 4, and, for example, a predetermined image or character is displayed using the modulated light. When the light that has exited from the liquid crystal panel 4 is transmitted through the light diffusing sheet 7, an angle distribution of the exited light is in a wider state than that of the light before it is incident upon the light diffusing sheet 7, and the light exits from the light diffusing sheet 7. This makes it possible for the viewer to view the display with a wide viewing angle.

A specific structure of the liquid crystal panel 6 is described below.

Here, although, a description is given using an active-matrix transmissive liquid crystal panel as an example, liquid crystal panels that are applicable to the embodiment is not limited to active-matrix transmissive liquid crystal panels. Liquid crystal panels that are applicable to the embodiment may be, for example, semi-transmissive (transmissive/reflecting) liquid crystal panels or reflecting liquid crystal panels. Further, they may be simple matrix liquid crystal panels in which each pixel does not include a switching thin film transistor (hereunder abbreviated as "TFT").

FIG. 3 is a vertical sectional view of the liquid crystal panel 6.

As shown in FIG. 3, the liquid crystal panel 6 includes a TFT substrate 9, serving as a switching element substrate, a color filter substrate 10, and a liquid crystal layer 11. The color filter substrate 10 is disposed so as to oppose the TFT substrate 9. The liquid crystal layer 11 is sandwiched between the TFT substrate 9 and the color filter substrate 10. The liquid crystal layer 11 is sealed in a space that is surrounded by the TFT substrate 9, the color filter substrate 10, and a frame-shaped sealing material (not shown) that bonds the TFT substrate 9 and the color filter substrate 10 with a predetermined interval being provided therebetween. The liquid crystal panel 4 according to the embodiment performs display in, for example, a VA (vertical alignment) mode, and vertically aligned liquid crystals having a negative dielectric anisotropy are used in the liquid crystal layer 11. A spherical spacer 12 for keeping the interval between the substrates constant is disposed between the TFT substrate 9 and the color filter substrate 10. The display mode is not limited to the aforementioned VA mode. For example, a TN (twisted nematic) mode, an STN (super twisted nematic) mode, or an IPS (in-plane switching) mode may also be used.

A plurality of pixels (not shown), which are minimum unit regions of display, are disposed in a matrix at the TFT substrate 9. A plurality of source bus lines (not shown) are formed at the TFT substrate 9 so as to extend parallel to each other. A plurality of gate bus lines (not shown) are formed at the TFT substrate 9 so as to extend parallel to each other and so as to be orthogonal to the plurality of source bus lines. Therefore, at the TFT substrate 9, the plurality of source bus lines and the plurality of gate bus lines are formed in a lattice, and a rectangular region that is divided by adjacent source bus lines and adjacent gate bus lines is defined as one pixel. The source bus lines are connected to TFT source electrodes (described later), and the gate bus lines are connected to TFT gate electrodes.

TFTs 19 each including, for example, a semiconductor layer 15, a gate electrode 16, a source electrode 17, and a drain electrode 18 are formed at a side of a transparent substrate 14 facing the liquid crystal layer 11, the transparent substrate 14 forming the TFT substrate 9. For example, a glass substrate may be used for the transparent substrate 14. Each semiconductor layer 15, formed of a semiconductor material such as CGS (continuous grain silicon), LPS (low-temperature polysilicon), or α-Si (amorphous silicon), is formed on the transparent substrate 14. A gate insulating film 20 is formed on the transparent substrate 14 so as to cover the semiconductor layer 15. As a material of the gate insulating film 20, for example, a silicon oxide film, a silicon nitride film, or a film in which these films are placed upon each other is used.

Each gate electrode 16 is formed on the gate insulating film 20 so as to oppose the semiconductor layer 15. As a material of each gate electrode 16, for example, a W (tungsten)/TaN (tantalum nitride) stacked film, Mo (molybdenum), Ti (titanium), or Al (aluminum) is used.

A first interlayer insulating film 21 is formed on the gate insulating film 20 so as to cover the gate electrodes 16. As a material of the first interlayer insulating film 21, for example, a silicon oxide film, a silicon nitride film, or a film in which these films are placed upon each other is used. The source electrodes 17 and the drain electrodes 18 are formed on the first interlayer insulating film 21. Each source electrode 17 is connected to a source region of the semiconductor layer 15 via a contact hole 22 that passes through the first interlayer insulating film 21 and the gate insulating film 20. Similarly, each drain electrode 18 is connected to a drain region of the semiconductor layer 15 via a contact hole 23 that passes through the first interlayer insulating film 21 and the gate insulating film 20. As materials of the source electrodes 17 and the drain electrodes 18, any of the aforementioned conducting materials used for the gate electrodes 16 are used. A second interlayer insulating film 24 is formed on the first interlayer insulating film 21 so as to cover the source electrodes 17 and the drain electrodes 18. As a material of the second interlayer insulating film 24, any of the aforementioned materials used for the first interlayer insulating film 21, or an organic insulating material is used.

Pixel electrodes 25 are formed on the second interlayer insulating film 24. Each pixel electrode 25 is connected to its corresponding drain electrode 18 via a contact hole 26 that passes through the second interlayer insulating film 24. Therefore, each pixel electrode 25 is connected to the drain region of the semiconductor layer 15 with each drain electrode 18 serving as a relay electrode. As a material of each pixel electrode 25, for example, a transparent conductive material, such as ITO (indium tin oxide) or IZO (indium zinc oxide), is used. By this structure, when a scanning signal is supplied via the gate bus lines, and the TFTs 19 are set to an on state, an image signal supplied to the source electrodes 17 via the source bus lines is supplied to the pixel electrodes 25 via the semiconductor layers 15 and the drain electrodes 18. An alignment film 27 is formed over the entire surface of the second interlayer insulating film 24 so as to cover the pixel electrodes 25. The alignment film 27 has alignment regulating capability that causes liquid crystal molecules of the liquid crystal layer 11 to be vertically aligned. The type of TFT may be a bottom gate TFT shown in FIG. 3, or a top gate TFT.

On the other hand, a black matrix 30, color filters 31, a planarizing layer 32, an opposing electrode 33, and an alignment film 34 are successively formed at a surface of the transparent substrate 29 facing the liquid crystal layer 11, the transparent substrate 29 forming the color filter substrate 10. The black matrix 30 is capable of blocking transmission of light at a region between pixels. The black matrix 30 is formed of a metal film, such as a Cr (chromium) film or a Cr/Cr oxide multilayer film, or photoresist in which carbon particles are dispersed in a photoconductive resin. The color filters 31 contain pigments of corresponding colors, red (R), green (G), and blue (B). One of the R, G, and B color filters 31 is disposed so as to oppose one pixel electrode 25 on the TFT substrate 9. The planarizing layer 32 is formed of an insulating film that covers the black matrix 30 and the color filters 31. The planarizing layer 32 is capable of performing planarization by reducing stepped portions formed by the black matrix 30 and the color filters 31. The opposing electrode 33 is formed at the planarizing layer 32. As a material of the opposing electrode 33, any of the transparent conductive materials used for forming the pixel electrodes 25 are used. The alignment film 34 having a vertical alignment regulating capability is formed over the entire surface of the opposing electrode 33. The color filters 31 may be formed of three colors R, G, and B, or more than the three colors.

As shown in FIG. 2, the backlight 2 includes a light source 36, such as a light emitting diode or cold-cathode tube, and an optical waveguide that utilizes internal reflection of light emitted from the light source 36, and causes the light to exit towards the liquid crystal panel 4. The backlight 2 may be an edge light in which the light source 36 is disposed at an edge of the optical waveguide 37 in this way, or a direct type in which the light source is disposed directly below the optical waveguide. In the backlight 2 used in the embodiment, it is desirable to use a backlight that is provided with directivity as a result of controlling the direction in which the light is emitted, or what is called a directional backlight. If a directional backlight in which collimated or substantially collimated light is caused to be incident upon a light diffusing section of the light diffusing sheet 7 (described later) is used, it is possible to reduce blur, and increase the efficiency with which light is used.

The aforementioned directional backlight makes it possible to optimize, for example, the shape and arrangement of a reflection pattern that is formed in the optical waveguide 37.

The first polarizing plate 3 that functions as a polarizer is provided at the backlight-2-side of the pair of glass substrates 14. The second polarizing plate 5 that functions as a polarizer is provided between the light diffusing sheet 7 and the pair of glass substrates 14. The first retardation plate 13 for compensating for a phase difference of light is provided between the first polarizing plate 3 and the pair of glass substrates 14, and the second retardation plate 8 for compensating for a phase difference of light is provided between the second polarizing plate 5 and the pair of glass substrates 14.

The light diffusing sheet 7 will hereunder be described in detail.

As shown in FIGS. 1 and 2, the light diffusing sheet 7 includes a base material 39, a plurality of light blocking sections 40, and a transparent resin layer 41 (light transmissive material layer). The plurality of light blocking sections 40 are formed at one surface (the surface at a side opposite to the viewing side) of the base material 39. The transparent resin layer 41 is formed at one surface of the base material 39. As shown in FIG. 2, the light diffusing sheet 7 is fixed to the second polarizing plate 5 with an adhesive layer 42 so that the side of the light diffusing sheet 7 where the transparent resin layer 41 is provided faces the second polarizing plate 5 and the side of the light diffusing sheet 7 where the base material 39 is provided faces the viewing side.

As the base material 39, a transparent resin base material, such as a triacetyl cellulose (TAC) film, a polyethylene terephthalate (PET) film, a polycarbonate (PC) film, a polyethylene naphthalate (PEN) film, and a polyethersulfone (PES) film, is desirably used. The base material 39 becomes a foundation when later applying materials of the light blocking sections 40 and the transparent resin layer 41 in a manufacturing process that is described later. Therefore, it is necessary to provide heat resistance and mechanical strength in a heat treatment step in the manufacturing process. Consequently, in addition to a resin base material, for example, a glass base material may also be used as the base material 39. In addition, it is desirable that the total light transmittance of the base material 39 be at least 90% according to JIS K7361-1. If the total light transmittance is at least 90%, satisfactory transparency is achieved. In the embodiment, a transparent resin base material having a thickness of 100 μm is used as an example.

As shown in FIG. 1, the plurality of light blocking sections 40 are formed in a scattered manner at one surface (the surface at the side opposite to the viewing side) of the base material 39. In the embodiment, the planar shape of each light blocking section 40 is a circular shape when each light blocking section 40 is viewed from a direction of a normal line to the base material 39. The plurality of light blocking sections 40 are regularly disposed. Here, an x axis is defined as a predetermined direction in a plane that is parallel to a screen of the liquid crystal panel 4, a y axis is defined as a direction that is orthogonal to the x axis in the plane, and a z axis is defined as a thickness direction of the liquid crystal display device 1. Of the plurality of light blocking sections 40, for example, the light blocking sections 40 in each column in the direction of the y axis are disposed at a certain pitch, and the light blocking sections 40 in each row in the direction of the x axis are disposed at a certain pitch. In addition, the light blocking sections 40 in a predetermined column in the direction of the y axis and the light blocking sections 40 in a column that is adjacent to the predetermined column in the direction of the x axis are displaced by ½ pitch each in the direction of the y axis.

For example, each light blocking section 40 is formed of a layer containing, for example, a black pigment, a black dye, or a black resin having photosensitivity and light absorbency, such as a black resist, containing carbon black. When, for example, resin containing carbon black is used, the film forming each light blocking section 40 can be deposited in a printing step, so that, for example, the amount of material used is small and the throughput is high. In addition, a metallic film such as a Cr (chromium) film or Cr/Cr oxide multilayer film may be used. When such a metallic films or a multilayer film is used, since the optical densities of these are high, light is sufficiently absorbed using a thin film.

In the embodiment, the diameter of each light blocking section 40 is, for example, 10 μm, and the pitch between adjacent light blocking sections 40 is, for example, 20 μm.

The transparent resin layer 41 is formed at one surface of the base material 39. The transparent resin layer 41 is formed of an organic material having light transmitting properties and photosensitivity, such as acrylic resin or epoxy resin.

In addition, it is desirable that the total light transmittance of the transparent resin layer 41 be at least 90% as defined by JIS K7361-1. If the total light transmittance is at least 90%, satisfactory transparency is achieved. The layer thickness of the transparent resin layer 41 is set sufficiently larger than the thickness of each light blocking section 40. In the embodiment, the layer thickness of the transparent resin layer 41 is, for example, on the order of 25 μm, and the layer thickness of each light blocking section 40 is, for example, on the order of 150 nm.

The transparent resin layer 41 has hollow portions 43 in regions where the light blocking sections 40 are formed. Each of the hollow portions 43 has a shape in which a cross-section area when each hollow section 43 is cut at a plane that is parallel to the one surface of the base material 39 is large on a light blocking section 40 side and becomes gradually smaller with increasing distance from the corresponding light blocking section 40. That is, when each hollow portion 43 is viewed from the side of the base material 39, each hollow portion 43 has what is called the shape of a truncated cone that is tapered in a forward direction. Air exists in the interior of each hollow portion 43. A portion of the transparent resin layer 41 other than where the hollow portions 43 are formed, that is, a portion of the transparent resin layer 41 where the transparent resin exists continuously is a portion that contributes to the transmission of light. Therefore, in the description below, the portion of the transparent resin layer 41 other than the hollow portions 43 is also called a light transmitting section 44. Light that is incident upon the light transmitting section 44 is guided in a substantially confined state in the interior of the light transmitting section 44 while being totally reflected at an interface between the light transmitting section 44 and each hollow portion 43, and exits to the outside via the base material 39.

Figure 4A:
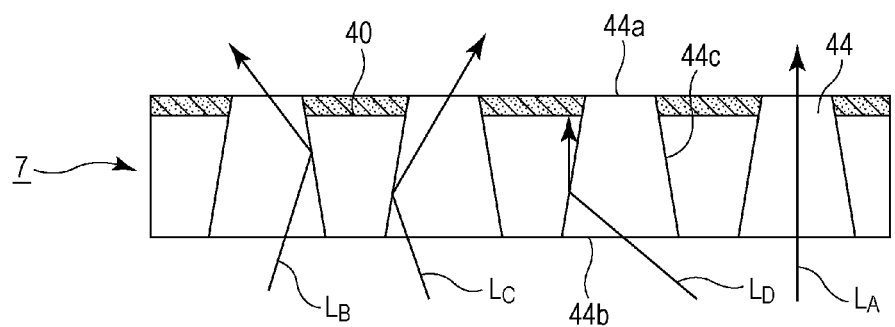
FIG. 4A illustrates reflection of light at side surfaces of a light transmitting section of a light diffusing sheet in the liquid crystal display device.

As shown in FIG. 2, the light diffusing sheet 7 is disposed so that the base material 39 faces the viewing side. Therefore, as shown in FIG. 4A, of two opposite surfaces of the light transmitting section 44, the surface having a smaller area (the surface at the side that contacts the base material 39) becomes a light-exiting end surface 44a, and the surface having a larger area (the surface at a side that is opposite to the side of the base material 39) becomes a light-incident end surface 44b. It is desirable that an inclination angle θ (angle between the light-exiting end surface 44a and a side surface 44c) at the side surface 44c of the light transmitting section 44 (interface between the light transmitting section 44 and the hollow portion 43) be on the order of 60° to 85°. However, the inclination angle at the side surface 44c of the light transmitting section 44 is not particularly limited as long as the angle is not too large to cause loss of incident light and allows sufficient diffusion of the incident light.

Figure 4B:
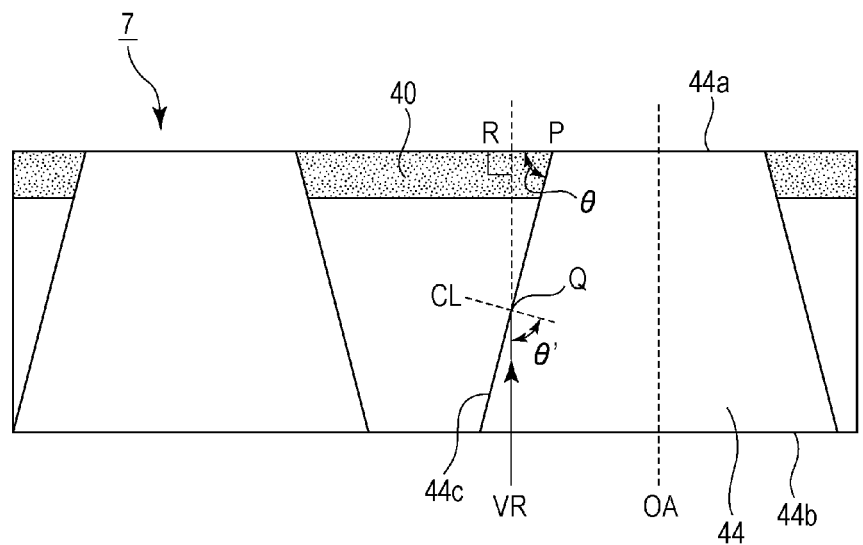
FIG. 4B illustrates reflection of light at a side surface of the light transmitting section of the light diffusing sheet in the liquid crystal display device.

As shown in FIG. 4B, the angle θ between the light-exiting end surface 44a and the side surface 44c of the light transmitting section 44 is set to an angle θ' (in degrees) that exceeds a critical angle with respect to a normal line CL to the side surface 44c of the light transmitting section 44 so that incident light that is parallel or substantially parallel to an optical axis OA is totally reflected. If a point where the side surface 44c of the light transmitting section 44 intersects the light-exiting end surface 44a is defined as point P, a point where incident light VR that is parallel to the optical axis OA is incident upon the side surface 44c is defined as point Q, and an intersection point where a perpendicular line passing through the point Q among perpendicular lines that are perpendicular to the light-exiting end surface 44a intersects the light-exiting end surface 44a is defined as point R, an angle θ between the side surface 44c of the light transmitting section 44 and the light-exiting end surface 44a that is orthogonal to the optical axis OA can be represented by an angle QPR. Since, here, the value of the angle PQR is (90−θ)°, the inclination angle θ at the side surface 44c of the light transmitting section 44 is equal to an incidence angle θ' of the incident light VR at the point Q. Therefore, the inclination angle θ at the side surface 44c of the light transmitting section 44 is an angle that exceeds the critical angle.

In the embodiment, since air exists in each hollow portion 43, if the light transmitting section 44 is formed of, for example, a transparent acrylic resin, a side surface 44c of the light transmitting section 44 becomes an interface between the transparent acrylic resin and air. Here, the difference between refractive indices at an interface between an internal portion and an external portion of the light transmitting section 44 is larger when the hollow portion 43 is filled with air than when the surrounding of the light transmitting section 44 is filled with a different general material having a low refractive index. Therefore, from Snell's law, an incidence angle range at which light is totally reflected at the side surface 44c of the light transmitting section 44 is wide. As a result, it is possible to reduce loss of light and obtain high brightness.

Each hollow portion 43 may be filled with an inert gas, such as nitrogen, instead of air.

Alternatively, the interior of each hollow portion 43 may be in a vacuous state.

As indicated by arrows LB and LC in FIG. 4A, incident lights that are incident upon the corresponding side surfaces 44c at angles that are greater than a critical angle are totally reflected at the corresponding side surfaces 44c, pass through the light transmitting section 44, and exit towards a viewer. In addition, as indicated by arrow LA in FIG. 4A, incident light that is not incident upon any side surface 44c and that passes through the light transmitting section 44 exits as it is towards the viewer. On the contrary, as indicated by arrow LD in FIG. 4A, incident light that is incident upon its corresponding side surface 44c at an angle that is equal to or less than the critical angle passes through the side surface 44c of the light transmitting section 44 without being totally reflected.

In the embodiment, since the light-absorbing light blocking sections 40 are provided in the regions other than where the light transmitting section 44 is provided, light that has passed through a side surface 44c of the light transmitting section 44 is absorbed at the corresponding light blocking section 40. Therefore, a display blur and a reduction in contrast caused by, for example, stray light do not occur. However, if the light that passes through a side surface 44c of the light transmitting section 44 is increased, the quantity of light that exists towards the viewing side is reduced, as a result of which an image having a high brightness cannot be obtained. Therefore, in the liquid crystal display device 1 according to the embodiment, it is desirable to use a backlight in which light exists at an angle that does not allow light to be incident upon a side surface 44c of the light transmitting section 44 at an angle that is equal to or less than a critical angle, that is, to use a directional backlight.

It is desirable that the refractive index of the base material 39 and the refractive index of the transparent resin layer 41 be substantially equal to each other. This is because, for example, if the refractive index of the base material 39 and the refractive index of the transparent resin layer 41 are considerably different from each other, when light that is incident from the light-incident end surface 44b tries to exit from the transparent resin layer 41, unnecessary refraction and reflection of light occur at an interface between the transparent resin layer 41 and the base material 39, as a result of which a desired viewing angle may not be obtained or the quantity of exiting light may be reduced.

Next, a method of manufacturing the liquid crystal display device 1 having the above-described structure is described using FIGS. 5A to 5D.

A description is hereunder given while focusing on the steps of manufacturing the light diffusing sheet 7.

First, the steps of manufacturing the liquid crystal panel 6 are schematically described. First, a TFT substrate 9 and a color filter substrate 10 are formed. Then, a surface of the TFT substrate 9 at a side where TFTs 19 are formed and a surface of the color filter substrate 10 at a side where color filters 31 are formed are disposed so as to oppose each other, and the TFT substrate 9 and the color filter substrate 10 are bonded to each other using a sealing material. Then, liquid crystals are injected into a space that is surrounded by the TFT substrate 9, the color filter substrate 10, and the sealing material. Then, at the respective surfaces of the liquid crystal panel 4 that has been formed in this way, a first retardation film 13, a first polarizing plate 3, a second retardation plate 8, and a second polarizing plate 5 are bonded to each other using, for example, an optical adhesive. By performing the aforementioned steps, the liquid crystal panel 6 is completed.

For the method of manufacturing the TFT substrate 9 and the color filter substrate 10, publicly known existing methods are used. Therefore, it will not be described.

Figure 5A:
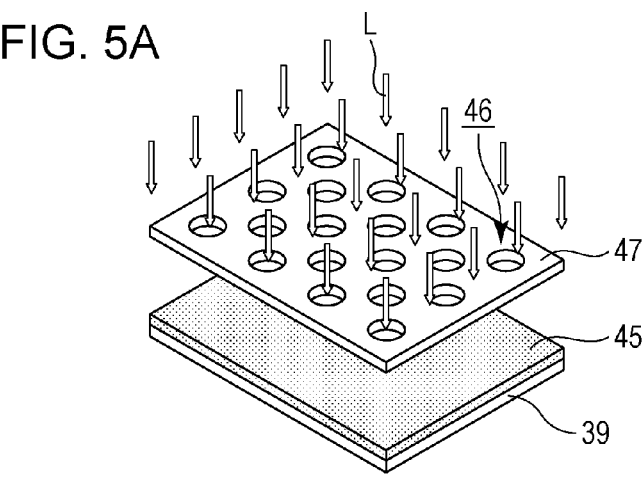
FIG. 5A is a perspective view of a step of manufacturing the light diffusing sheet.

First, as shown in FIG. 5A, a base material 39 having a thickness of 100 μm and formed of triacetyl cellulose is provided. By spin coating, a black negative resist containing carbon and serving as a light blocking section material is applied to one surface of the base material 39, to form a coating film 45 having a film thickness of 150 nm.

Next, the base material 39 that is provided with the aforementioned coating film 45 is placed on a hot plate, and the coating film 45 is prebaked at a temperature of 90° C. This causes the solvent in the black negative resist to volatilize.

Next, using an exposure device, the coating film 45 is exposed by being irradiated with light L via a photomask 47 having opening patterns 46 whose planar shapes are circular. Here, an exposure device using a combination of an i-line having a wavelength of 365 nm, an h-line having a wavelength of 404 nm, and a g-line having a wavelength of 436 nm is used. The exposure amount is 100 mJ/cm$^2$.

Figure 5B:
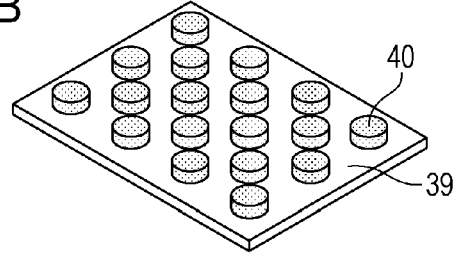
FIG. 5B is a perspective view of a step of manufacturing the light diffusing sheet.

After the exposure using the photomask 47, the coating film 45 formed of black negative resist is developed using a dedicated developer, and is dried at 100° C. In this way, as shown in FIG. 5B, a plurality of light blocking sections 40 whose planar shapes are circular are formed on one surface of the base material 39. In the embodiment, in the next step, the light blocking sections 40 formed of black negative resist are used as masks to expose a transparent negative resist, so that hollow portions 43 are formed. Therefore, the positions of the opening patterns 46 of the photomask 47 correspond to the positions of the hollow portions 43. The circular light blocking sections 40 correspond to a light transmitting section-44 non-formation region (hollow portions 43) in the next step. The opening patterns 46 are all circular patterns having a diameter of 100 μm. The interval (pitch) between adjacent opening patterns 46 is 20 μm. It is desirable that the pitch between the opening patterns 46 be less than the interval (pitch, such as 150 μm) between pixels of the liquid crystal panel 4. By this, since at least one light blocking section 40 is to be formed in a pixel, it is possible to provide a wide viewing angle when used in combination with, for example, a liquid crystal panel used in a mobile device or the like and having a small pixel pitch.

In the embodiment, the light blocking sections 40 are formed by photolithography using a black negative resist. However, if, in place of this structure, a photomask in which light blocking patterns and the opening patterns 46 in the embodiment are reversed is used, it is possible to use a light-absorbing positive resist. Alternatively, the light blocking sections 40 may be directly formed using, for example, an evaporation method or a printing method.

Figure 5C:
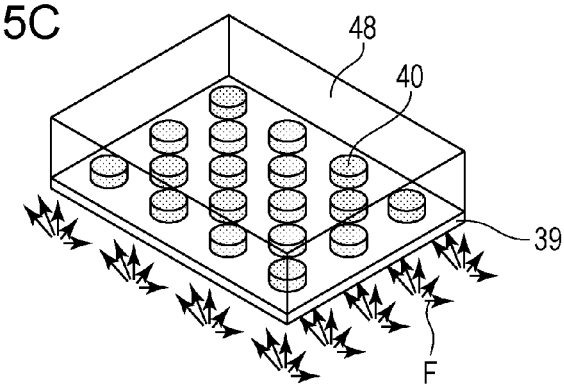
FIG. 5C is a perspective view of a step of manufacturing the light diffusing sheet.

Next, as shown in FIG. 5C, by spin coating, a transparent negative resist formed of acrylic resin and serving as a light transmitting section material is applied to a top surface of the light blocking sections 40, to form a coating film 48 having a film thickness of 25 μm.

Next, the base material 39 that is provided with the aforementioned coating film 48 is placed on a hot plate, and the coating film 48 is prebaked at a temperature of 95° C. This causes the solvent in the transparent negative resist to volatilize.

Next, the coating film 48 is exposed by being irradiated with light F from the side of the base material 39 using the light blocking sections 40 as masks. Here, an exposure device using a combination of an i-line having a wavelength of 365 nm, an h-line having a wavelength of 404 nm, and a g-line having a wavelength of 436 nm is used. The exposure amount is 500 mJ/cm$^2$.

Thereafter, the base material 39 that is provided with the aforementioned coating film 48 is placed on a hot plate, and the coating film 48 is subjected to post-exposure baking (PEB) at a temperature of 95° C.

Figure 5D:
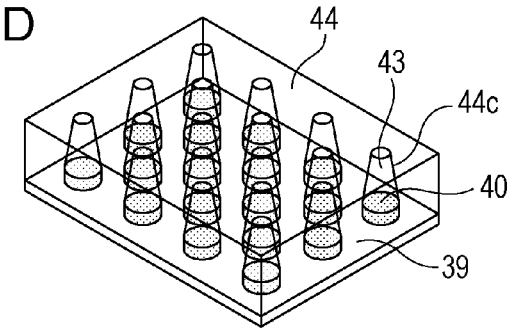
FIG. 5D is a perspective view of a step of manufacturing the light diffusing sheet.

Next, the coating film 48 formed of transparent negative resist is developed using a dedicated developer, and is post-baked at 100° C. As shown in FIG. 5D, this causes a transparent resin layer 41 having a plurality of hollow portions 43 to be formed at one surface of the base material 39. In the embodiment, as shown in FIG. 5C, since the exposure is performed using diffused light, the transparent negative resist that forms the coating film 48 is radially exposed outward in a spreading manner from the light-blocking-section-40 non-formation region. This causes the forward tapered hollow portions 43 and the reverse-tapered light transmitting section 44 to be formed. The inclination angle of each side surface 44c of the light transmitting section 44 can be controlled on the basis of the degree of diffusion of the diffused light.

The light F used here may be parallel light, diffused light, or light whose intensity at a particular exiting angle differs from its intensity at a different exiting angle, that is, light having an intensity at a particular exiting angle. When parallel light is used, the inclination angle at each side surface 44c of the light transmitting section 44 is one inclination angle, for example, on the order of 60° to 85°. When diffused light is used, the surface is an inclined surface whose shape in cross section is curved and whose inclination angle changes continuously. When light having an intensity at a particular exiting angle is used, the surface is an inclined surface having an inclination angle corresponding to the intensity. In this way, it is possible to adjust the inclination angle of each side surface 44c of the light transmitting section 44. This makes it possible to adjust the light diffusibility of the light diffusing sheet 7 so that the intended viewability can be obtained.

As one means of irradiating the base material 39 with parallel light that has exited from the exposure device being used as the light F, a diffused plate having a haze on the order of 50 is placed at an optical path of the light that has exited from the exposure device, and the base material 39 is irradiated with the light via the diffused plate.

By performing the steps shown in FIGS. 5A to 5D, the light diffusing sheet 7 according to the embodiment is completed. It is desirable that the total light transmittance of the light diffusing sheet 7 be at least 90%. If the total light transmittance is at least 90%, satisfactory transparency is obtained, so that the light diffusing sheet 7 can exhibit satisfactory optical performance that is required of the light diffusing sheet 7. The total light transmittance is in accordance with JIS K7361-1. Although, in the embodiment, a liquid resist is used as an example, a film resist may also be used in place of this structure.

Lastly, as shown in FIG. 2, while the base material 39 faces the viewing side and the light transmitting section 44 faces the second polarizing plate 5, the completed light diffusing sheet 7 is bonded to the liquid crystal panel 6 using an adhesive layer 42.

By performing the above-described steps, the liquid crystal display device 1 according to the embodiment is completed.

Figure 6A:
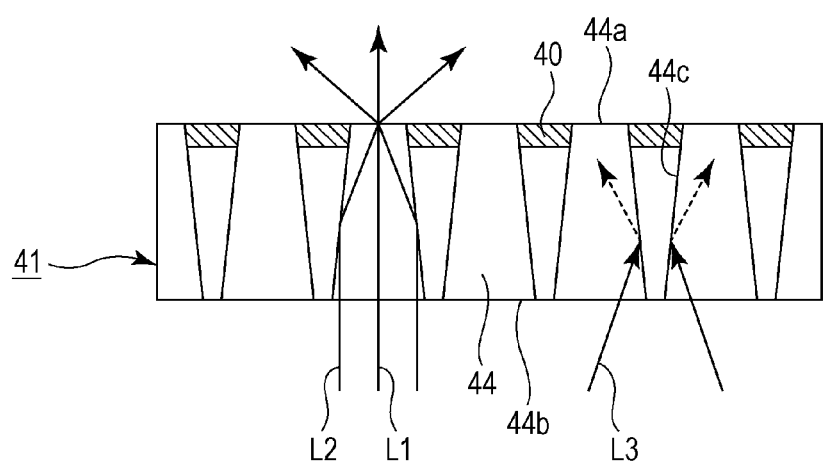
FIG. 6A is a schematic view for illustrating actions at the light diffusing sheet.
Figure 6B:
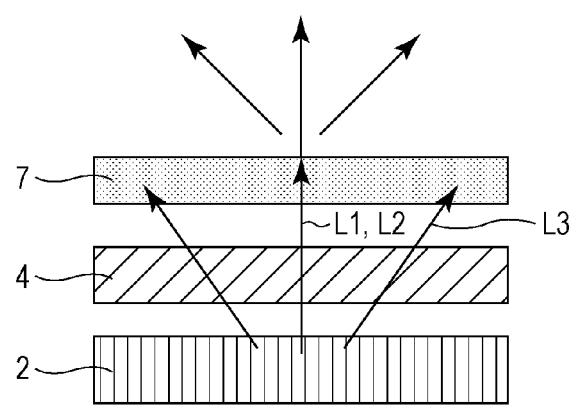
FIG. 6B is a schematic view for illustrating actions at the light diffusing sheet.

The advantageous effects of increasing the viewing angle of the light diffusing sheet 7 according to the embodiment are described using FIGS. 6A and 6B.

As shown in FIG. 6A, of lights that exit from the liquid crystal panel 6 and that are incident upon the light diffusing sheet 7, light L1 that is substantially perpendicularly incident upon the light-incident end surface 44b in the vicinity of the center of the light transmitting section 44 passes as it is through the light transmitting section 44 in a straight line without being totally reflected by a side surface 44c of the light transmitting section 44. Light L2 that is substantially perpendicularly incident upon the light-incident end surface 44b at a peripheral edge portion of the light transmitting section 44 is incident upon a side surface 44c of the light transmitting section at an incidence angle that is greater than a critical angle, so that the light L2 is totally reflected at the side surface 44c of the light transmitting section 44. The totally reflected light is then further refracted at the light-exiting end surface 44a, and exits in a direction that is directed at a large angle with respect to a direction of a normal line to the light-exiting end surface 44a. On the contrary, light L3 that is obliquely incident upon the light-incident end surface 44b of the light transmitting section 44 is incident upon a side surface 44c of the light transmitting section 44 at an incidence angle that is smaller than the critical angle, so that the light L3 passes through the side surface 44c of the light transmitting section 44 and is absorbed by its corresponding light blocking section 40.

By the above-described actions, as shown in FIG. 6B, the lights L1 and L2 that are substantially perpendicularly incident upon the light diffusing sheet 7 exit from the light diffusing sheet 7 with an angle distribution that is wider than that before the lights L1 and L2 are incident upon the light diffusing sheet 7. Therefore, a viewer can view a good display even if the line of sight of the viewer is tilted from the direction of the front surface of the liquid crystal panel 6 (direction of the normal line). In particular, in the embodiment, since the planar shape of each side surface 44c (reflecting surface) of the light transmitting section 44 is circular, the angle distribution widens in all directions with the direction of the normal line to the screen of the liquid crystal panel 6 being the center. Therefore, the viewer can view a good display in all directions. That is, the use of the light diffusing sheet 7 makes it possible to increase the viewing angle of the liquid crystal panel 6. On the contrary, the light L3 that is obliquely incident upon the light diffusing sheet 7 is light that has obliquely passed through the liquid crystal panel 4, and is light having a retardation that differs from a desired retardation, that is, light that causes a reduction in display contrast. The light diffusing sheet 7 according to the embodiment makes it possible to increase display contrast by cutting off such light at the light blocking sections 40.

In existing light diffusing sheets, the individual light transmitting sections are isolated from each other. For example, if, in order to increase the degree of diffusion of light, the density of the light transmitting sections is increased and the size of each light transmitting section is reduced, the area of contact between each light transmitting section and the base material is reduced. This reduces adhesion force between each light transmitting section and the base material, as a result of which, for example, external force causes separation, tilting, or the like of each light transmitting section. Therefore, existing light diffusing sheets were no longer capable of providing the desired light diffusion. In contrast, in the light diffusing sheet 7 according to the embodiment, the plurality of hollow portions 43 that are provided at the transparent resin layer 41 are isolated from each other, and the portions that become the light transmitting section 44 form a continuous shape in a plane. Consequently, for example, even if, in order to increase the degree of diffusion of light, the density of the hollow portions 43 is increased and the volume of the light transmitting section 44 is reduced, it is possible to provide a sufficient area of contact between the light transmitting section 44 and the base material 39. Thus, adhesion force between the light transmitting section 44 and the base material 39 is greater than that in existing light diffusing sheets. Therefore, defects in the light transmitting section 44 caused by, for example, external force occur less frequently, so that the desired light diffusing capability can be provided.

If, in the step of patterning the light transmitting section 44, the method of irradiation using light from the side of the coating film 48, formed of a transparent negative resist, via a photomask is used, it is very difficult to adjust the alignment between the photomask and the base material 39 where the very small light blocking sections 40 are formed, as a result of which misalignment cannot be avoided. As a result, the light transmittance may be reduced due to overlapping of the light transmitting section 44 and the light blocking sections 40. In contrast, in the embodiment, since the transparent resin layer 41 is irradiated with the light F from the back surface of the base material 39 with the light blocking sections 40 serving as masks, the light transmitting section 44 is formed in a self-aligned state in the light-blocking-section-40 non-formation region. As a result, the light transmitting section 44 and the light blocking sections 40 do not overlap each other, thereby making it possible to reliably maintain the light transmittance. In addition, since a precise alignment operation is not required, it is possible to reduce manufacturing time.

Further, if the light blocking sections 40 are not provided on the base material 39, outside light that is incident upon the light diffusing sheet 7 from the viewing side is repeatedly reflected at, for example, the hollow portions 43, as a result of which the reflected light is viewed as scattered light at the viewing side. Such scattering caused by the outside light reduces viewability at bright places. This causes "misadjusted black level" in which the black color during display in black appears white, as a result of which contrast is reduced. Therefore, a proper image cannot be viewed. In contrast, the light diffusing sheet 7 according to the embodiment is provided with a plurality of light blocking sections 40, so that these phenomena can be eliminated.

In the embodiment, since the volumes of the hollow portions 43 are the same, the volume of the resin that is removed when the transparent resin layer 41 is being developed is constant. Therefore, the speed of developing each hollow portion 43 in the step of forming each hollow portion 43 is constant, and a desired tapered shape can be formed. As a result, the uniformity of the minute form of the light diffusing sheet 7 is increased, and yield is increased.

Figure 7A:
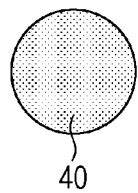
FIG. 7A is a plan view of another exemplary light blocking section of the light diffusing sheet.
Figure 7B:
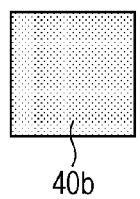
FIG. 7B is a plan view of another exemplary light blocking section of the light diffusing sheet.
Figure 7C:
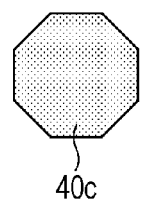
FIG. 7C is a plan view of another exemplary light blocking section of the light diffusing sheet.
Figure 7D:
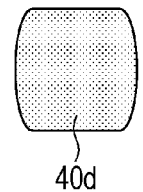
FIG. 7D is a plan view of another exemplary light blocking section of the light diffusing sheet.
Figure 7E:
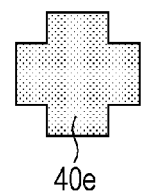
FIG. 7E is a plan view of another exemplary light blocking section of the light diffusing sheet.
Figure 7F:
FIG. 7F is a plan view of another exemplary light blocking section of the light diffusing sheet.
Figure 7G:
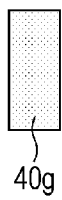
FIG. 7G is a plan view of another exemplary light blocking section of the light diffusing sheet.
Figure 7H:
FIG. 7H is a plan view of another exemplary light blocking section of the light diffusing sheet.
Figure 7I:
FIG. 7I is a plan view of another exemplary light blocking section of the light diffusing sheet.
Figure 7J:
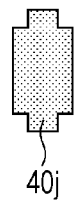
FIG. 7J is a plan view of another exemplary light blocking section of the light diffusing sheet.

Although, in the embodiment, as shown in FIG. 7A, the light blocking sections 40 each having a planar shape that is circular are used as an example, for example, light blocking sections 40b each having a planar shape that is square may be used as shown in FIG. 7B. Alternatively, as shown in FIG. 7C, light blocking sections 40c each having a planar shape that is a regular octagonal shape may be used. Alternatively, as shown in FIG. 7D, light blocking sections 40d each having a shape whose two opposing sides of a square are curved outward may be used. Alternatively, as shown in FIG. 7E, light blocking sections 40e each having a shape in which two rectangular shapes orthogonally intersect each other in two directions may be used. Alternatively, as shown in FIG. 7F, light blocking sections 40f each having an elongated elliptical shape may be used. Alternatively, as shown in FIG. 7G, light blocking sections 40g each having an elongated rectangular shape may be used. Alternatively, as shown in FIG. 7H, light blocking sections 40h each having an elongated octagonal shape may be used. Alternatively, as shown in FIG. 7I, light blocking sections 40i each having a shape in which two opposing sides of an elongated rectangular shape are curved outward may be used. Alternatively, as shown in FIG. 7J, light blocking sections 40j each having a shape in which two rectangular shapes having different horizontal-to-vertical ratios orthogonally intersect each other in two directions may be used.

Since the planar shape of each light blocking section 40 according to the embodiment is circular as shown in FIG. 7A, the shapes of the side surfaces 44c of the light transmitting section 44, that is, the sectional shapes of the reflecting surfaces, are also circular. Therefore, light that has been reflected by the side surfaces 44c of the light transmitting section 44 is diffused by 360 degrees in all directions. In contrast, if, for example, the square light blocking section 40b shown in FIG. 7B is used, light is diffused in directions that are perpendicular to the sides of the square. In addition, if the rectangular light blocking section 40g shown in FIG. 7G is used, light diffusing power in directions perpendicular to the long sides is greater than that in directions perpendicular to the short sides. Therefore, it is possible to realize a light diffusing sheet having a light diffusing power in a vertical direction (up-down direction) and a light diffusing power in a horizontal direction (left-right direction) that differ from each other depending upon the lengths of the sides. Further, if the octagonal light blocking section 40c shown in FIG. 7C is used, it is possible to diffuse light in a concentrated manner, in particular, in an oblique direction at an angle of 45 degrees, and a horizontal direction and the vertical direction, where viewing angle characteristics are considered important in the liquid crystal display device. As stated above, when viewing angle anisotropy is required, it is possible to obtain different light diffusing characteristics as a result of changing the shape of each light blocking section as appropriate.

Second Embodiment

A second embodiment of the present invention is hereunder described using FIGS. 8 to 10C.

The basic structure of a liquid crystal display device according to this embodiment is the same as that of the liquid crystal display device according to the first embodiment, except that the arrangement of light blocking sections of a light diffusing sheet differs from that in the first embodiment. Therefore, in this embodiment, the basic structure of the liquid crystal display device is not described. Only the light diffusing sheet is described.

Figure 8:
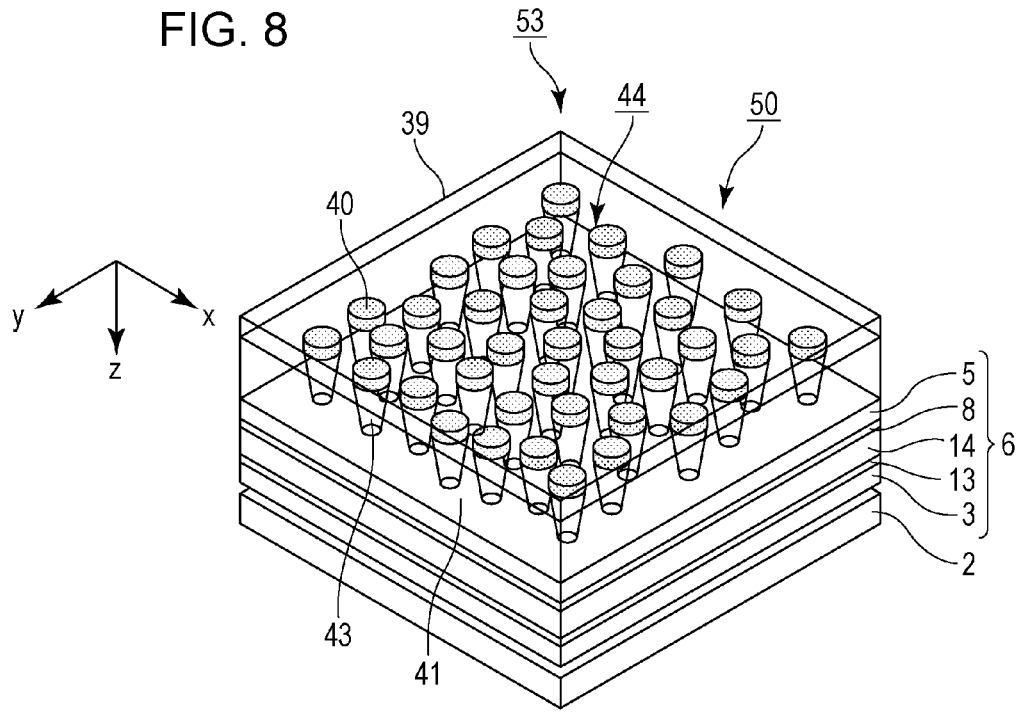
FIG. 8 is a perspective view of a liquid crystal display device according to a second embodiment.

FIG. 8 is a perspective view of the light crystal display device according to the embodiment. FIGS. 9A to 9D are sectional views illustrating the steps of manufacturing the light diffusing sheet according to the embodiment that are carried out in turns. FIGS. 10A to 10C show the arrangements of the light blocking sections of the light diffusing sheet according to the embodiment.

In FIGS. 8 to 10C, structural elements that are common to those in the figures used in the first embodiment are given the same reference numerals, and are not described in detail below.

In the light diffusing sheet 7 according to the first embodiment, the plurality of light blocking sections 40 each having a planar shape that is circular are regularly disposed on the base material. In contrast, in the light diffusing sheet 50 according to this embodiment, as shown in FIG. 8, a plurality of light blocking sections 40 each having a planar shape that is circular are randomly disposed on a base material 39.

Therefore, a plurality of hollow portions 43 that are formed at positions that correspond to those of the plurality of light blocking sections 40 are also randomly disposed at the base material 39.

Figure 9A:
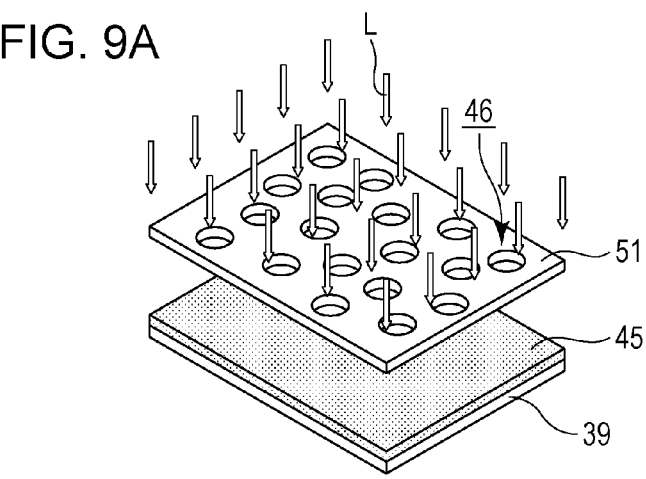
FIG. 9A is a perspective view of a step of manufacturing a light diffusing sheet.
Figure 9B:
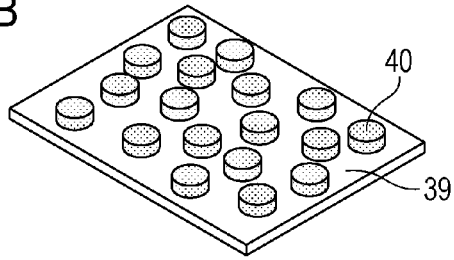
FIG. 9B is a perspective view of a step of manufacturing the light diffusing sheet.
Figure 9C:
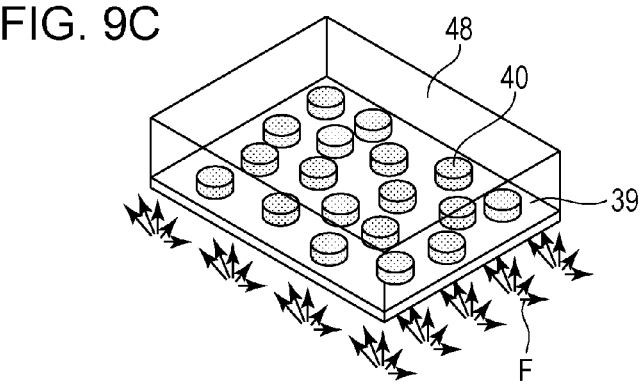
FIG. 9C is a perspective view of a step of manufacturing the light diffusing sheet.
Figure 9D:
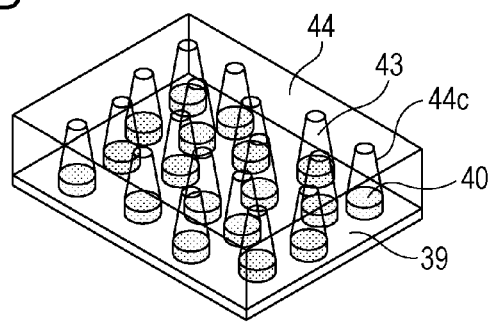
FIG. 9D is a perspective view of a step of manufacturing the light diffusing sheet.
Figure 10C:
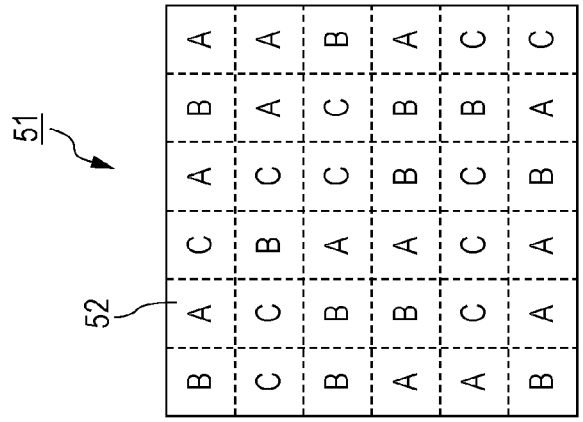
FIG. 10C shows an arrangement of the light blocking sections of the light diffusing sheet.

The steps of manufacturing the light diffusing sheet 50 according to the embodiment are the same as those according to the first embodiment as shown in FIGS. 9A to 9D. However, a photomask 51 shown in FIG. 9A and used in the step of exposing a black negative resist for forming the light blocking sections differ from the photomask 47 used in the first embodiment. As shown in FIG. 9A, in the photomask 51 according to the embodiment, a plurality of opening patterns 46 each having a planar shape that is circular are randomly disposed. A coating film 45, formed of a black negative resist, is irradiated with light L via the photomask 51, and is developed, so that, as shown in FIG. 9B, the plurality of light blocking sections 40 that are randomly disposed on the base material 39 are formed.

Here, an exemplary method of designing the photomask 51 in which the plurality of opening patterns 46 are randomly disposed is described.

First, as shown in FIG. 10A, the entire photomask 51 is divided into m×n regions 52 (such as 36 regions 52) including m regions (such as six regions) in the vertical direction and n regions (such as six regions) in the horizontal direction.

Next, as shown in FIG. 10B, one region 52 that has been divided in the previous step is filled with circles, which correspond to the shapes of the opening patterns 46, at maximum density (figure on the left side in FIG. 10B). Next, using random functions, position data, serving as reference of the position of each circle, such as a central coordinate of each circle, is varied, to form a plurality of types of position data (such as three types of patterns A, B, and C) (the three figures on the right side in FIG. 10B).

Next, as shown in FIG. 10C, the plurality of types of pieces of position data A, B, and C that have been formed in the previous step are randomly allotted to the m×n regions. For example, the pieces of position data A, the pieces of position data B, and the pieces of position data C are allotted to the respective regions 52 so that the pieces of position data A, the pieces of position data B, and the pieces of position data C randomly appear in the 36 regions 52. Therefore, if the photomask 51 is viewed according to each individual region 52, the opening pattern 46 in each region 52 corresponds to the pattern of any one of the position data A, the position data B, and the position data C, so that it does not mean that all of the opening patterns 46 in all of the regions are completely randomly disposed. However, when the photomask 51 is viewed as a whole, the plurality of opening patterns 46 are randomly disposed.

Even in the light diffusing sheet 50 according to the embodiment, advantageous effects that are the same as those of the first embodiment are provided. That is, for example, it is possible to maintain the desired light diffusing capability without reducing light transmittance as a result of reducing the frequency with which defects, caused by, for example, external force, occur in the light transmitting section 44; and it is possible to reduce manufacturing time because a precise alignment operation is not required.

It is known that, in general, when patterns having regularity, such as stripes or gratings, are placed upon each other, interference fringes (moire) are visible due to a shift in the cycle. For example, when the light diffusing sheet in which a plurality of light blocking sections are disposed in a matrix and the liquid crystal panel in which a plurality of pixels are disposed in a matrix are superposed upon each other, moire occurs between a cyclic pattern based on the light diffusing sections of the light diffusing sheet and a cyclic pattern based on the pixels of the liquid crystal panel, as a result of which display quality may be reduced. In contrast, according to a liquid crystal display device 53 of the embodiment, since the plurality of light blocking sections 40 are randomly disposed in a plane, moire caused by interference with the regular arrangement of the pixels of the liquid crystal panel 4 does not occur, thereby making it possible to maintain display quality.

In addition, in the embodiment, even if the hollow portions 43 are randomly disposed in a plane, since the volumes of the hollow portions 43 are the same, the volume of the resin that is removed when a transparent resin layer 41 is being developed is constant. Therefore, the speed of developing each hollow portion 43 in the step of forming each hollow portion 43 is constant, and a desired tapered shape can be formed. As a result, the uniformity of the minute form of the light diffusing sheet 7 is increased, and yield is increased.

Third Embodiment

A third embodiment of the present invention is hereunder described using FIGS. 11 and 12A to 12D.

The basic structure of a liquid crystal display device according to this embodiment is the same as those of the liquid crystal display devices according to the first and second embodiments, except that the structure of each light blocking section of a light diffusing sheet differs from those in the first and second embodiments. Therefore, in this embodiment, the basic structure of the liquid crystal display device is not described. Only the light diffusing sheet is described.

Figure 11:
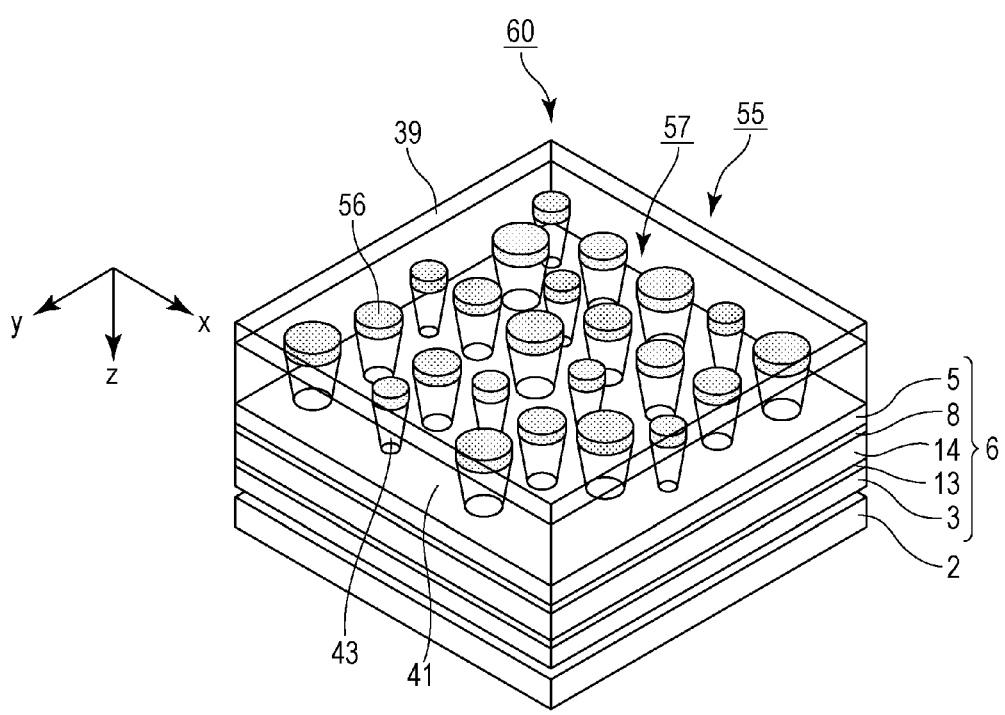
FIG. 11 is a perspective view of a liquid crystal display device according to a third embodiment.

FIG. 11 is a perspective view of the liquid crystal display device according to the embodiment. FIGS. 12A to 12D illustrate a method of manufacturing the light diffusing sheet according to the embodiment.

In FIGS. 11 and 12A to 12D, structural elements that are common to those in the figures used in the first and second embodiments are given the same reference numerals, and are not described in detail below.

In the first and second embodiments, the plurality of light blocking sections 40 all have the same size. In contrast, in the light diffusing sheet 55 according to the embodiment, as shown in FIG. 11, the sizes (diameters) of the plurality of light blocking sections 56 differ from each other. For example, the diameters of the plurality of light blocking sections 56 are in the range of from 10 µm to 25 µm. That is, the plurality of light blocking sections 56 come in various sizes. As in the second embodiment, the plurality of light blocking sections 56 are randomly disposed in a plane. Of the plurality of hollow portions 43, at least one hollow portion 43 has a volume that differs from the volumes of the other hollow portions 43. The other structural features are the same as those of the first embodiment.

Figure 12A:
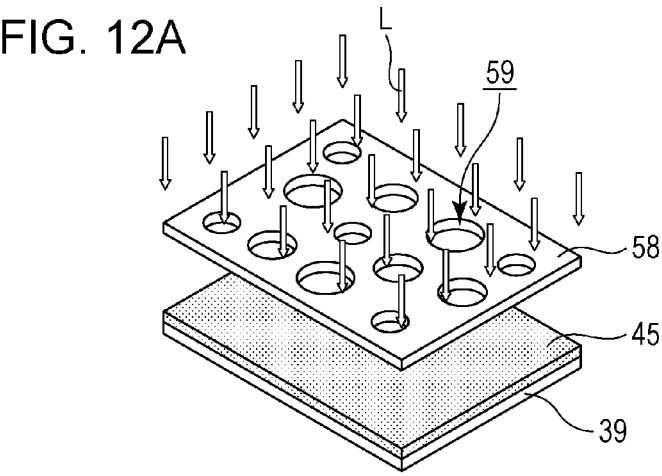
FIG. 12A is a perspective view of a step of manufacturing a light diffusing sheet.
Figure 12B:
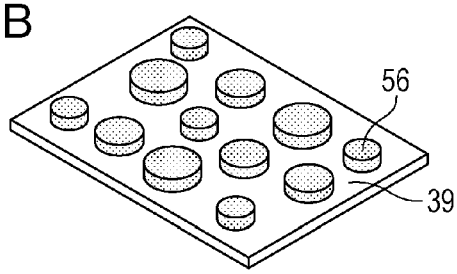
FIG. 12B is a perspective view of a step of manufacturing the light diffusing sheet.
Figure 12C:
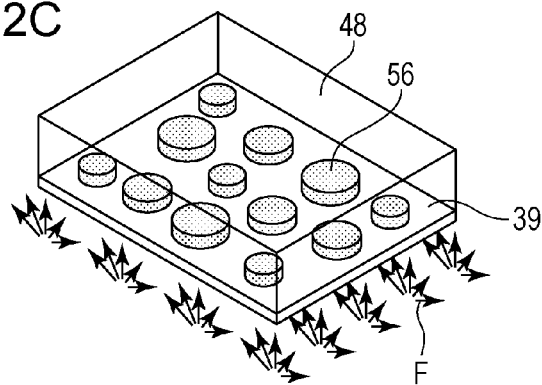
FIG. 12C is a perspective view of a step of manufacturing the light diffusing sheet.
Figure 12D:
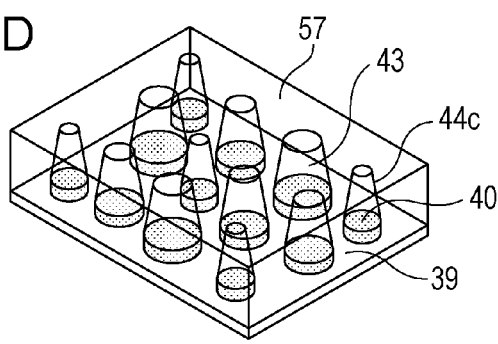
FIG. 12D is a perspective view of a step of manufacturing the light diffusing sheet.

The steps of manufacturing the light diffusing sheet 55 are the same as those in the first embodiment, except that, as shown in FIG. 12A, a photomask 58 used when forming the light blocking sections 56 have a plurality of opening patterns 59 having different sizes.

Even in the light diffusing sheet 55 according to the embodiment, advantageous effects that are the same as those of the first embodiment are provided. That is, for example, it is possible to maintain the desired light diffusing capability without reducing light transmittance as a result of reducing the frequency with which defects, caused by, for example, external force, occur in a light transmitting section 57; and it is possible to reduce manufacturing time because a precise alignment operation is not required. In the embodiment, since the plurality of light blocking sections 56 have different sizes in addition to being randomly disposed, it is possible to reliably reduce moire fringes caused by diffraction phenomenon of light. In addition, since the volume of at least one of the hollow portions 43 differs from the volumes of the other hollow portions 43, it is possible to improve light diffusibility.

Fourth Embodiment

Figure 13:
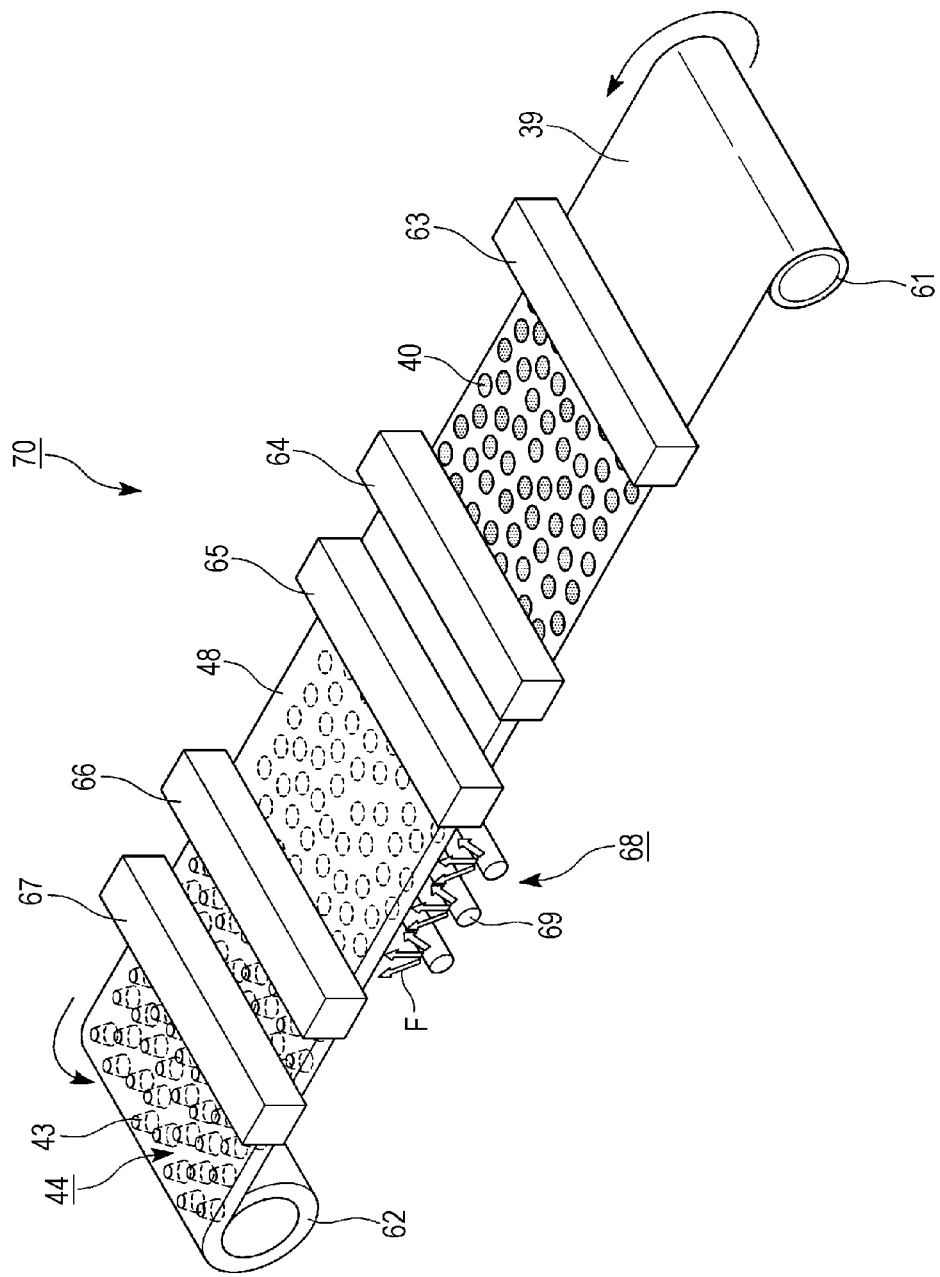
FIG. 13 is a schematic view of a structure of a manufacturing device used in manufacturing steps of a light diffusing sheet according to a fourth embodiment.

A fourth embodiment of the present invention is hereunder described using FIG. 13.

In the embodiment, a modified manufacturing process of a light diffusing sheet is described.

FIG. 13 is a schematic view of a structure of an exemplary device for manufacturing a light diffusing sheet 7.

A manufacturing device 70 shown in FIG. 13 transports a long base material 39 by a roll-to-roll method, and various operations are performed during the transport. In forming light blocking sections 40, the manufacturing device 70 uses a printing method instead of photolithography utilizing the aforementioned photomask 47.

As shown in FIG. 13, the manufacturing device 70 includes a send-out roller 61 that is provided at one end thereof and that sends out the base material 39, and a takeup roller 62 that is provided at the other end thereof and that takes up the base material 39. The base material 39 is formed so as to move from the side of the send-out roller 61 towards the side of the takeup roller 62. From the side of the send-out roller 61 towards the side of the takeup roller 62, a printing device 63, a bar code device 64, a first drying device 65, a developing device 66, and a second drying device 67 are successively disposed on an upper side of the base material 39. An exposure device 68 is disposed at a lower side of the base material 39. The printing device 63 prints the light blocking sections 40, formed of black resin, on the base material 39. The bar code device 64 applies a transparent negative resist to the light blocking sections 40. The first drying device 65 dries the applied transparent negative resist to form a coating film 48. The developing device 66 develops the exposed transparent negative resist using developer. The second drying device 67 dries the base material 39 provided with a light transmitting section 44 formed of the developed transparent negative resist.

The exposure device 68 exposes the coating film 48, formed of the transparent negative resist, from the side of the base material 39. As shown in FIG. 13, the exposure device 68 includes a plurality of light sources 59. In the plurality of light sources 59, as the base material 39 is transported, the intensity of diffused light F from each light source 59 may change, for example, the intensity of the diffused light F from each light source 59 may gradually decrease. Alternatively, in the plurality of light sources 59, as the base material 39 is transported, the exiting angle of the diffused light F from each light source 59 may gradually change. Using such an exposure device 68, it is possible to control the inclination angle of each side surface 44c of the light transmitting section 44 to a desired angle.

According to the method of manufacturing the light diffusing sheet of the embodiment, since the light blocking sections 40 are formed using the printing method, it is possible to reduce the amount of black resin material that is used. In addition, since the light transmitting section 44 is formed in a self-aligned state with the light blocking sections 40 serving as masks, a precise alignment operation is not required, so that it is possible to reduce manufacturing time. Even if the manufacturing process is considered as a whole, the manufacturing process is a process of manufacturing the light diffusing sheet using a roll-to-roll method. Therefore, it is possible to provide a low-cost manufacturing method providing high throughput.

In the above-described embodiment, a liquid resist is applied when forming the light blocking sections 40 and the light transmitting section 44. However, instead of using this structure, a film resist may also be applied to one surface of the base material 39.

Fifth Embodiment

Figure 14:
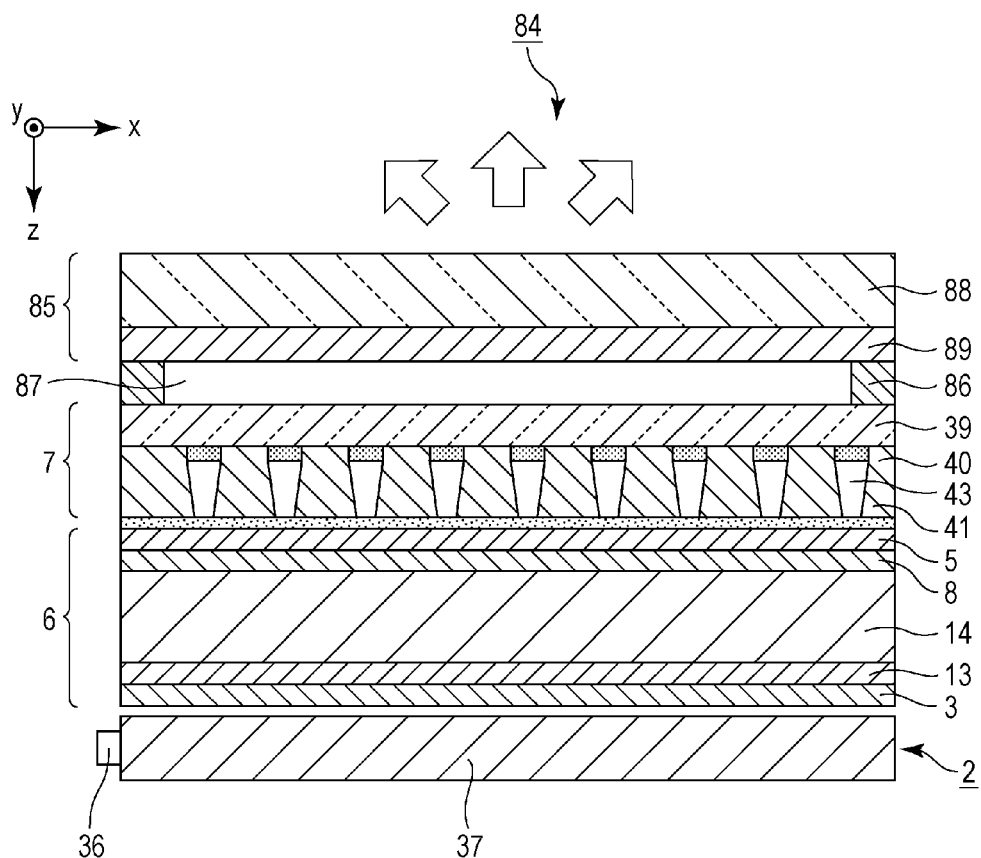
FIG. 14 is a sectional view of a liquid crystal display device according to a fifth embodiment.

A fifth embodiment of the present invention is hereunder described using FIG. 14.

The basic structure of a liquid crystal display device according to this embodiment is the same as that of the liquid crystal display device according to the first embodiment, except that a touch panel is provided. Therefore, in this embodiment, the basic structure of the liquid crystal display device is not described. Only the structure of the touch panel is described.

In FIG. 14, structural elements that are common to those in FIG. 2 used in the first embodiment are given the same reference numerals, and are not described in detail below.

In a liquid crystal display device 84 according to this embodiment, as shown in FIG. 14, the structure extending from a backlight 2 to a light diffusing sheet 7 is the same as that in the first embodiment. A touch panel 85 (information inputting device) is disposed at the viewing side of a base material 39 of the light diffusing sheet 7. In the description below, the base material 39 that forms the light diffusing plate 7 is called the "light-diffusing-sheet base material".

At a peripheral edge portion of the light-diffusing-sheet base material 39, the touch panel 85 is bonded to the light-diffusing-sheet base material 39 using an adhesive material 86, such as a two-sided tape. A gap having a size corresponding to the thickness of the adhesive material 86 is formed between the touch panel 85 and the light-diffusing-sheet base material 39. That is, an air layer 87 exists between the touch panel 85 and the light-diffusing-sheet base material 39.

The touch panel 85 includes a base material 88 and a position detecting electrode 89. In the description below, the base material 88 that forms the touch panel 85 is called the "touch-panel base material". The position detecting electrode 89, formed of a transparent conductive material such as ITO or ATO (antimony-doped tin oxide), is formed at one surface of the touch-panel base material 88 formed of, for example, glass. The position detecting electrode 89 is formed by sputtering, for example, ITO or ATO, and has a uniform sheet resistance on the order of from a few hundred to 2 kΩ/sq.

In the embodiment, the capacitive touch panel 85 is used. In the capacitive touch panel 85, for example, a very small voltage is applied to four corners of the position detecting electrode 89 when the touch panel 85 is seen in plan view. When a finger contacts any position at an upper side of the position detecting electrode 89, a point with which the finger has contacted is connected to ground through human body capacitance. This causes the voltage at each corner to change in accordance with the resistance value between the grounding point and each of the four corners. A position detection circuit measures the voltage change as current change, and detects the grounding point, that is, the position with which the finger has contacted from the measured value.

The touch panel that is applicable to the embodiment is not limited to one using a capacitive sensing method. Any touch panel using, for example, a resistive membrane system, an ultrasonic system, or an optical system is applicable to the embodiment.

Since the liquid crystal display device 84 according to this embodiment includes the light diffusing sheet 7 that is similar to that according to the first embodiment, it is possible to realize a liquid crystal display device having excellent viewing angle characteristics and an information inputting capability. For example, when a user touches the touch panel 85 with his/her finger or a pen while viewing an image having a wide viewing angle, it is possible to interactively input information to, for example, an information processing device.

The technical scope of forms of the present invention is not limited to the above-described embodiments. Various changes can be made within the scope that does not depart from the gist of the forms of the present invention. For example, although, in the above-described embodiments, a liquid crystal display device is described as an example of a display member, the present invention is not limited thereto. For example, a form of the present invention may be applied to an organic electroluminescent display device or a plasma display.

Although, in the above-described embodiments, the light diffusing sheet is bonded to the second polarizing plate of the liquid crystal panel, the light diffusing sheet and the liquid crystal panel may not necessarily be in contact with each other. For example, another optical film or optical component may be inserted between the light diffusing sheet and the liquid crystal panel.

Alternatively, the light diffusing sheet and the liquid crystal panel may be distant from each other. Alternatively, since a polarizing plate is not required for, for example, an organic electroluminescent display device or a plasma display, contact between the light diffusing sheet and a polarizing plate does not occur.

In addition, at least one of an antireflection layer, a polarizing filter layer, an antistatic layer, an antiglare processing layer, and an antifouling processing layer may be provided at the viewing side of the base material of the light diffusing sheet in the above-described embodiments. According to this structure, in accordance with the type of layer that is provided at the viewing side of the base material, it is possible to add, for example, the capability of reducing reflection of outside light, the capability of preventing adhesion of dust and dirt, or the capability of preventing scratches. Therefore, it is possible to prevent deterioration of viewing angle characteristics with time.

In the above-described embodiments, for example, the structure in which the hollow portions of the light diffusing sheet are filled with air, the structure in which the hollow portions are filled with inert gas, and the structure in which the interiors of the hollow portions are in a vacuous state have been exemplified.

Figure 15:
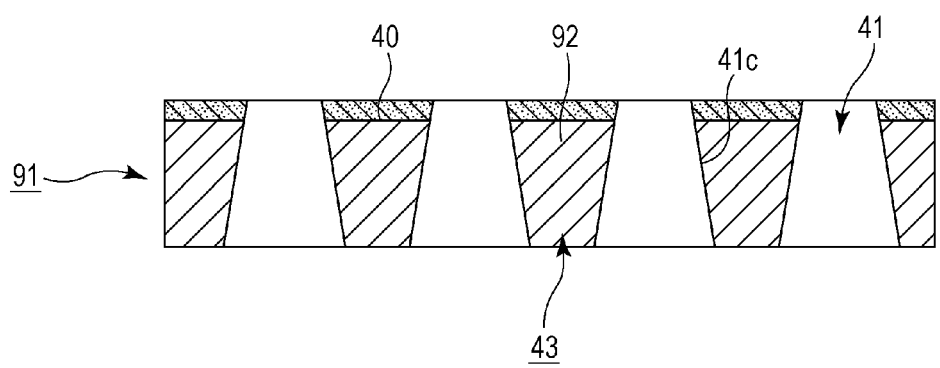
FIG. 15 is a sectional view of a modification of the light diffusing sheet.

Instead of these structures, for example, a structure like a light diffusing sheet 91 shown in FIG. 15 in which hollow portions 43 are filled with a low-refractive-index material 92 having a refractive index that is lower than the refractive index of the transparent resin layer 41 may be used. According to this structure, the strength of the light diffusing sheet 91 can be increased. In this structure, it is desirable that the difference between the refractive index of the low-refractive-index material 92 and the refractive index of the transparent resin layer 41 be greater than or equal to 0.05. This causes light at an interface between the low-refractive-index material 92 and the transparent resin layer 41 to be sufficiently totally reflected.

Figure 16A:
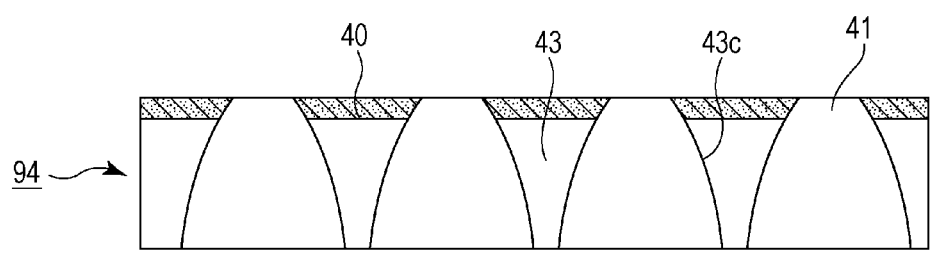
FIG. 16A is a sectional view of another modification of the light diffusing sheet.
Figure 16B:
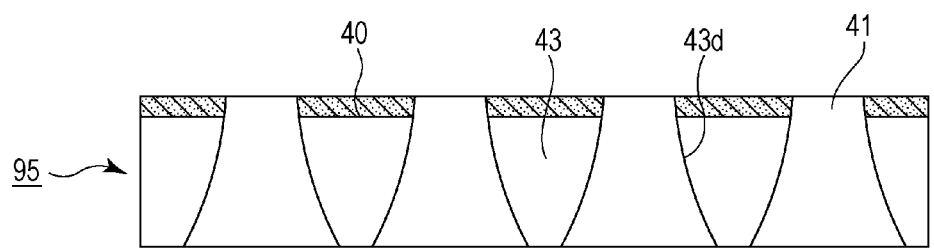
FIG. 16B is a sectional view of another modification of the light diffusing sheet.

Although, in the above-described embodiments, the inclination angles at the side surfaces of the light transmitting section are constant, the inclination angles at the side surfaces of the light transmitting section may differ depending upon locations. For example, a light diffusing sheet 94 shown in FIG. 16A and a light diffusing sheet 95 shown in FIG. 16B may include inclined surfaces whose cross section shapes are curved such that inclination angles at interfaces between hollow portions 43 and a transparent resin layer 41 (side surfaces of a light transmitting section) change continuously. In the light diffusing sheet 94 shown in FIG. 16A, each interface 43c between its corresponding hollow portion 41 and the transparent resin layer 43 is curved towards the corresponding hollow portion 43, and each hollow portion 43 has a concave shape. In the light diffusing sheet 95 shown in FIG. 16B, each interface 43d between its corresponding hollow portion 43 and the transparent resin layer 41 is curved towards the transparent resin layer 41, and each hollow portion 43 has a convex shape. These structures make it possible to improve light diffusibility.

Figure 17A:
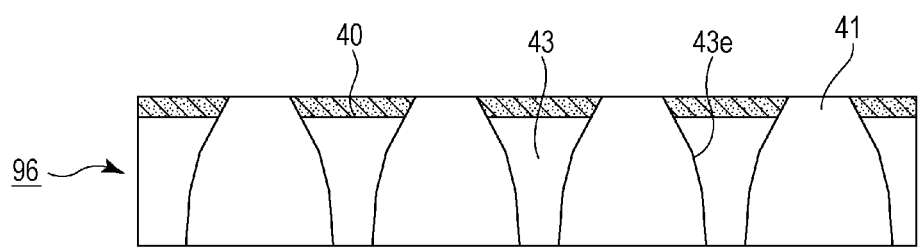
FIG. 17A is a sectional view of still another modification of the light diffusing sheet.
Figure 17B:
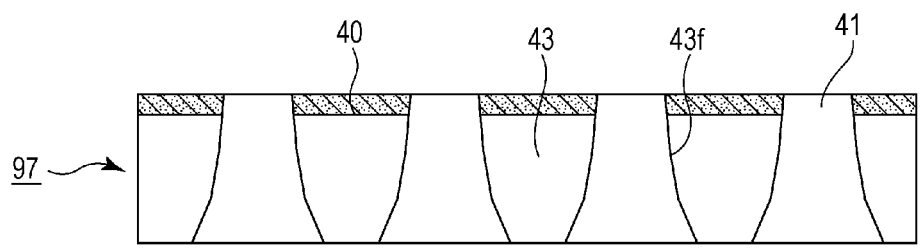
FIG. 17B is a sectional view of still another modification of the light diffusing sheet.

Alternatively, a light diffusing sheet 96 shown in FIG. 17A and a light diffusing sheet 97 shown in FIG. 17B may include inclined surfaces whose cross section shapes are defined by polygonal lines such that interfaces between hollow portions 43 and a transparent resin layer 41 (side surfaces of a light transmitting section) each have a plurality of different inclination angles. In the light diffusing sheet 96 shown in FIG. 17A, each interface 43e between its corresponding hollow portion 43 and the transparent resin layer 41 has three inclined surfaces having different inclination angles, and each hollow portion 43 has a concave shape. In the light diffusing sheet 97 shown in FIG. 17B, each interface 43f between its corresponding hollow portion 43 and the transparent resin layer 41 has three inclined surfaces having different inclination angles, and each hollow portion 43 has a convex shape. These structures make it possible to improve light diffusibility.

Although, in the above-described embodiments, the shapes of the light blocking sections are circular or polygonal, the shapes of the light blocking sections may not be necessarily symmetrical. If, as in the above-described embodiments, the shapes of the light blocking sections are circular or polygonal, exiting light exhibits a symmetrical angle distribution. In contrast, if an asymmetrical angle distribution is intentionally required according to the application and use of the display device, when, for example, the viewing angle of only the upper side or right side of a screen is required to be widened, the shapes of the light blocking sections may be asymmetrical.

The base material forming the light diffusing sheet may have light diffusibility. Alternatively, the transparent resin layer (light transmissive material layer) may have light diffusibility. Alternatively, the adhesive layer may have light diffusibility. These structures make it possible to improve light diffusibility.

Further, specific structures related to, for example, the arrangements and shapes of the light transmitting section and the light blocking sections, the size and material of each portion of the light diffusing sheet, and manufacturing conditions in the manufacturing process are not limited to those in the above-described embodiments, so that changes can be made as appropriate.

INDUSTRIAL APPLICABILITY

Forms of the present invention are applicable to various display devices such as liquid crystal display devices, organic electroluminescent display devices, and plasma displays.

REFERENCE SIGNS LIST 1, 53, 60, 84 liquid crystal display device (display device)
6 liquid crystal panel (display member)
7, 50, 55, 91, 94, 95, 96, 97 light diffusing sheet (light diffusing member, viewing angle increasing member)
39 base material
40, 40b, 40c, 40d, 40e, 40f, 40g, 40h, 40i, 40j, 56 light blocking section
41 transparent resin layer (light transmissive material layer)
43 hollow portion
44, 57 light transmitting section
85 touch panel (information inputting device)

The invention claimed is:

1. A light diffusing member comprising:
a base material having a light transmitting property;
a plurality of light blocking sections that are formed in a scattered manner at one surface of the base material; and
a light transmissive material layer that is formed at the one surface of the base material,
wherein a thickness of the light transmissive material layer is larger than a thickness of each light blocking section,
wherein the light transmissive material layer has hollow portions in regions where the light blocking sections are formed, and each hollow portion has a shape in which a cross-section area when each hollow portion is cut at a plane that is parallel to the one surface of the base material is large on a side of the corresponding light blocking section and becomes gradually smaller with increasing distance from the corresponding light blocking section, and
wherein a portion of the light transmissive material layer other than where the hollow portions are formed is a light transmitting section.

2. The light diffusing member according to claim 1, wherein each light blocking section is formed of a light absorbing material.

3. The light diffusing member according to claim 2, wherein the light absorbing material is a resin containing carbon black.

4. The light diffusing member according to claim 2, wherein the light absorbing material is a multilayer film formed of chromium and chromium oxide.

5. The light diffusing member according to claim 1, wherein each hollow portion is filled with air or an inert gas, or is in a vacuous state.

6. The light diffusing member according to claim 1, wherein interfaces between the hollow portions and the light transmissive material layer are inclined surfaces, and a cross section shape of each inclined surface is curved such that an inclination angle changes continuously.

7. The light diffusing member according to claim 1, wherein interfaces between the hollow portions and the light transmissive material layer are inclined surfaces, and
wherein a cross section shape of each inclined surface is defined by a polygonal line having a plurality of different inclination angles.

8. The light diffusing member according to claim 1, wherein the plurality of light blocking sections are nonperiodically disposed when viewed from a direction of a normal line to the one surface of the base material.

9. The light diffusing member according to claim 1, wherein, of the plurality of light blocking sections, at least one of the light blocking sections has a size that differs from sizes of the other light blocking sections.

10. The light diffusing member according to claim 1, wherein, of the plurality of hollow portions, at least one of the hollow portions has a volume that differs from volumes of the other hollow portions.

11. The light diffusing member according to claim 1, wherein a planar shape of each light blocking section is a circular shape, an elliptical shape, or a polygonal shape when each light blocking section is viewed from a direction of a normal line to the one surface of the base material.

12. The light diffusing member according to claim 1, wherein the base material has light diffusibility.

13. The light diffusing member according to claim 1, wherein the light transmissive material layer has light diffusibility.

14. The light diffusing member according to claim 1, further comprising an adhesive layer,
wherein the adhesive layer is provided between the base material and the light transmissive material layer, and has light diffusibility.

15. The light diffusing member according to claim 1, wherein at least one of an antireflection layer, a polarizing filter layer, an antistatic layer, an anti-glare processing layer, and an antifouling processing layer are provided at a surface of the base material that is at a side opposite to a side of the one surface.

16. A display device comprising:
a display member; and
a viewing angle increasing member that is provided at a viewing side of the display member, the viewing angle increasing member causing light to exit with an angle distribution of light that is incident from the display member being wider than that before the light is incident from the display member, wherein the viewing angle increasing member includes the light diffusing member according to claim 1.

17. The display device according to claim 16, wherein the display member has a plurality of pixels that form a display image, and wherein, of the plurality of light blocking sections of the light diffusing member, adjacent light blocking sections are provided at an average interval that is smaller than an interval between the pixels of the display member.

18. The display device according to claim 16, wherein an information inputting device is provided at a viewing side of the viewing angle increasing member.

19. The display device according to claim 16, wherein the display member includes a light source and a light modulating element that modulates light from the light source, and wherein the light emitted from the light source is light having directivity.

20. The display device according to claim 16, wherein the display member is a liquid crystal display element.

* * * * *